(12) United States Patent
Asuke

(10) Patent No.: US 8,486,218 B2
(45) Date of Patent: *Jul. 16, 2013

(54) METHOD OF MANUFACTURING A PART OF A MEMS SYSTEM

(75) Inventor: Shintaro Asuke, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/607,885

(22) Filed: Sep. 10, 2012

(65) Prior Publication Data

US 2013/0001810 A1    Jan. 3, 2013

Related U.S. Application Data

(63) Continuation of application No. 13/330,899, filed on Dec. 20, 2011, now abandoned, which is a continuation of application No. 12/397,384, filed on Mar. 4, 2009, now Pat. No. 8,101,044.

(30) Foreign Application Priority Data

Mar. 6, 2008    (JP) .................................. 2008-56855

(51) Int. Cl.
    *B32B 27/00*    (2006.01)
    *B32B 37/30*    (2006.01)

(52) U.S. Cl.
    USPC .......................... 156/325; 428/447; 156/275.7

(58) Field of Classification Search
    USPC .......................................... 156/325; 428/447
    See application file for complete search history.

(56) References Cited

U.S. PATENT DOCUMENTS

| | | | |
|---|---|---|---|
| 4,392,907 A | 7/1983 | Shirato et al. |
| 5,439,554 A | 8/1995 | Tamura et al. |
| 5,498,306 A | 3/1996 | Shibata et al. |
| 5,753,720 A | 5/1998 | Nakanishi et al. |
| 5,982,041 A | 11/1999 | Mitani et al. |

(Continued)

FOREIGN PATENT DOCUMENTS

| | | |
|---|---|---|
| JP | 05-082404 | 4/1993 |
| JP | 05-338184 | 12/1993 |
| JP | 09-208829 | 8/1997 |
| JP | 09-286971 | 11/1997 |

(Continued)

*Primary Examiner* — Katarzyna Wyrozebski Lee
*Assistant Examiner* — Daniel Lee

(57) ABSTRACT

A method of manufacturing a bonded body of a semiconductor substrate and a semiconductor device to be mounted on the semiconductor substrate are provided. The method includes: preparing a first base member and a second base member; imparting liquid repellency for a liquid material to at least a part of a bonding film non-formation region of the first base member to form a liquid repellent region thereon; supplying the liquid material onto the first base member to selectively form a liquid coating on a bonding film formation region of the first base member; drying the liquid coating to obtain a bonding film on the bonding film formation region; and bonding the first base member and the second base member together through the bonding film due to a bonding property developed in a vicinity of a surface of the bonding film to thereby obtain the bonded body.

21 Claims, 8 Drawing Sheets

U.S. PATENT DOCUMENTS

| | | |
|---|---|---|
| 6,057,405 A | 5/2000 | Wengrovius et al. |
| 6,211,322 B1 | 4/2001 | Dohler et al. |
| 6,410,642 B1 | 6/2002 | Yamakawa et al. |
| 6,720,083 B2 | 4/2004 | Yamakawa et al. |
| 8,101,044 B2 | 1/2012 | Asuke |
| 8,211,259 B2 | 7/2012 | Sato et al. |
| 2003/0145940 A1 | 8/2003 | Chaudhury et al. |
| 2003/0159773 A1 | 8/2003 | Tomiyama et al. |
| 2009/0226741 A1 | 9/2009 | Asuke |

FOREIGN PATENT DOCUMENTS

| | | |
|---|---|---|
| JP | 10-081869 | 3/1998 |
| JP | 11-158437 | 6/1999 |
| JP | 11-315144 | 11/1999 |
| JP | 2000-235108 | 8/2000 |
| JP | 2001-019936 | 1/2001 |
| JP | 2003-066299 | 3/2003 |

METHOD OF MANUFACTURING A PART OF A MEMS SYSTEM

CROSS-REFERENCE TO RELATED APPLICATIONS

This application is a continuation of, and claims priority under 35 U.S.C. §120 on, application Ser. No. 13/330,899 filed Dec. 20, 2011, which is a continuation of application Ser. No. 12/397,384 filed Mar. 4, 2009, which claims priority under 35 U.S.C. §119 on Japanese Patent Application No. 2008-056855 filed on Mar. 6, 2008. Each of the above-identified related applications is expressly incorporated by reference herein in its entirety.

BACKGROUND

1. Technical Field

The present invention relates to a method of manufacturing a part of a microelectromechanical system (MEMS) that includes bonded body in which a first base member and a second base member are partially bonded together through a bonding film and a bonded body manufactured using such a method.

2. Related Art

Conventionally, when two members (base members) are bonded together to obtain a bonded body, a method, in which the two members are bonded together through an adhesive layer formed of an adhesive such as an epoxy-based adhesive or an urethane-based adhesive, has been often used.

In general, an adhesive exhibits reliably high adhesiveness regardless of constituent materials of the members to be bonded. Therefore, members formed of various materials can be bonded together in various combinations.

For example, a liquid droplet ejection head (an ink-jet type recording head) included in an ink-jet printer is assembled by bonding, using an adhesive, several members formed of different kinds of materials such as a resin-based material, a metal-based material, and a silicon-based material together.

When the members are to be bonded together using the adhesive to obtain an assembled body composed from the members, a liquid or paste adhesive is applied to surfaces of the members, and then the members are attached to each other via the applied adhesive on the surfaces thereof and firmly fixed together by hardening (setting) the adhesive with an action of heat or light.

However, in the case where the members are bonded together using the adhesive, there are problems in that (i) bonding strength between the members is low, (ii) dimensional accuracy of the obtained assembled body is low (for example, the adhesive is squeezed out from the assembled body), (iii) it takes a relatively long time until the adhesive is hardened, and (iv) the adhesive has low ink resistance (high resolvability against an organic solvent).

Further, it is often necessary to treat the surfaces of the members to be bonded using a primer in order to improve the bonding strength between the members. Therefore, additional cost and labor hour are required for performing the primer treatment, which causes an increase in cost and complexity of the process for bonding the members.

On the other hand, as a method of bonding members without using the adhesive, there is known a solid bonding method. The solid bonding method is a method of directly bonding members without an intervention of an intermediate layer composed of an adhesive or the like (see, for example, JP-A-5-82404).

Since such a solid bonding method does not need to use the intermediate layer composed of the adhesive or the like for bonding the members, it is possible to obtain a bonded body of the members having high dimensional accuracy.

However, the solid bonding method has the following problems: (A) constituent materials to be bonded are limited to specific kinds, (B) a heat treatment using a high temperature (e.g., about 700 to 800° C.) must be carried out in a bonding process, (C) an ambient atmosphere in the bonding process is limited to a reduced atmosphere, (D) since it is difficult to obtain a bonded body in which two members are partially bonded together, large stress due to a difference between thermal expansion coefficients of the two members is likely to be generated in a bonding interface therebetween, resulting in separation of the members of the bonded body.

In view of such problems, there is a demand for a method which is capable of partially and firmly bonding members with high dimensional accuracy and efficiently bonding them together at a low temperature regardless of constituent materials of the members to be bonded.

SUMMARY

Accordingly, it is an object of the present invention to provide a method of manufacturing a part of a MEMS that includes bonded body by which two base members can be partially and firmly bonded together with high dimensional accuracy and can be efficiently bonded together at a low temperature, and a bonded body in which the two base members are partially bonded together using such a method.

A first aspect of the present invention is directed to a method of manufacturing a bonded body of a semiconductor substrate and a semiconductor device to be mounted on the semiconductor substrate, wherein the bonded body is configured such that a first base member and a second base member are bonded together through a bonding film formed using a liquid material containing a silicone material composed of silicone compounds.

The method comprises: preparing the first base member having a surface, a bonding film formation region, where the bonding film is to be formed, provided on the surface and a bonding film non-formation region, where the bonding film is not to be formed, provided on the surface so as to be adjacent to the bonding film formation region, and the second base member; imparting liquid repellency for the liquid material to at least a part of the bonding film non-formation region to form a liquid repellent region thereon; supplying the liquid material onto the first base member to selectively form a liquid coating on the bonding film formation region with the aid of the liquid repellency of the liquid repellent region; drying the liquid coating to obtain the bonding film on the bonding film formation region; and bonding the first base member and the second base member together through the bonding film due to a bonding property developed in a vicinity of a surface of the bonding film by applying energy thereto to thereby obtain the bonded body.

This makes it possible to partially and firmly bond the first base member and the second base member together with high dimensional accuracy, and to efficiently bond them together at a low temperature.

Further, in the bonded body, a gap having a size corresponding to a thickness of the bonding film is formed between the first base member and the second base member. Therefore, by suitably controlling the shape of the bonding film, it is possible to form closed spaces, flow paths or the like in the bonded body by utilizing the gap.

In the above method, it is preferred that each of the silicone compounds has a polydimethylsiloxane chemical structure as a main chemical structure thereof.

Such silicone compounds can be preferably used as a major component of the silicone material, because they can be relatively easily available at a low price, and methyl groups included in the polydimethylsiloxane chemical structure can be easily broken and removed therefrom by applying the energy to the bonding film to thereby reliably develop the bonding property therein.

In the above method, it is preferred that each of the silicone compounds has at least one silanol group.

In this case, when drying the liquid coating to transform it into the bonding film, hydroxyl groups (included in the silanol groups) of the adjacent silicone compounds are bonded together. Therefore, the thus formed bonding film can have more excellent film strength.

In the above method, it is preferred that the liquid repellent region is formed so as to surround the bonding film formation region.

In this case, the liquid material supplied onto the first base member can reliably stay within the bonding film formation region to thereby form the liquid coating. This makes it possible to reliably form a liquid coating having a shape corresponding to that of the bonding film formation region.

In the above method, it is preferred that the liquid repellent region is formed by introducing liquid repellent functional groups each having the liquid repellency for the liquid material to the bonding film non-formation region or by forming a liquid repellent film having the liquid repellency for the liquid material on the bonding film non-formation region.

This makes it possible to easily form the liquid repellent region on the bonding film non-formation region, even if it has a complex pattern (shape).

In the above method, it is preferred that each of the liquid repellent functional groups is a fluoroalkyl group.

In this case, the liquid repellent region can exhibit excellent liquid repellency for the liquid material.

In the above method, it is preferred that the liquid repellent film is a self-assembled film or a plasma polymerization film.

This makes it possible to effectively obtain a dense and homogeneous liquid repellent film.

In the above method, it is preferred that in the liquid material supply step, before the liquid material is supplied onto the first base member, the bonding film formation region is subjected to a liquid wettable treatment capable of imparting liquid wettability for the liquid material to the bonding film formation region.

In this case, when the liquid material is supplied onto the first base member, it is repelled due to the liquid repellency of the liquid repellent region while being gathered onto the bonding film formation region due to the liquid wettability thereof. As a result, the liquid material can be selectively and reliably supplied onto the bonding film formation region.

In the above method, it is preferred that the liquid wettable treatment is performed by introducing hydroxyl groups to the bonding film formation region.

The hydroxyl groups can be easily introduced into the bonding film formation region by subjecting the bonding film formation region to an oxidation treatment using a simple method such as a method in which it is heated or a method in which an ultraviolet ray is irradiated thereon.

In the above method, it is preferred that in the bonding step, after the first base member and the second base member are laminated together through the bonding film, the energy is applied to the bonding film to thereby bond them together through the bonding film.

In a sate that the first base member and the second base member are laminated together, the bonding films are not bonded together. Therefore, since the first base member can be slid with respect to the second base member, it is possible to finely adjust a relative position therebetween with ease. As a result, dimensional accuracy of the finally obtained bonded body can be further improved.

In the above method, it is preferred that in the bonding step, the energy is applied to the bonding film by at least one method selected from the group comprising a method in which an energy beam is irradiated on the bonding film, a method in which the bonding film is heated and a method in which a compressive force is applied to the bonding film.

This makes it possible to effectively activate the surface of the bonding film. Further, according to the above method, it is possible to prevent excessive breakage of molecular bonds of the silicone compounds contained in the bonding film. Therefore, it is possible to prevent a property of the bonding film from being lowered.

In the above method, it is preferred that the energy beam is an ultraviolet ray having a wavelength of 126 to 300 nm.

Use of the ultraviolet ray having such a wavelength makes it possible to optimize an amount of the energy to be applied to the bonding film. As a result, it is possible to prevent excessive breakage of the molecular bonds of the silicone compounds constituting a main portion (a trunk portion) of the bonding film, and to selectively break the molecular bonds of the silicone compounds present in the vicinity of the surface of the bonding film. This makes it possible for the bonding film to develop the bonding property, while preventing a property thereof from being lowered.

In the above method, it is preferred that a temperature of the heating is in the range of 25 to 100° C.

This makes it possible to reliably improve bonding strength between the first base member and the second base member while reliably preventing them (the bonded body) from being thermally altered and deteriorated.

In the above method, it is preferred that the compressive force is in the range of 0.2 to 10 MPa.

This makes it possible to reliably improve bonding strength between the first base member and the second base member, while preventing occurrence of damages and the like therein due to an excess pressure.

In the above method, it is preferred that in the bonding step, the energy is applied to the bonding film in an air atmosphere.

By doing so, it becomes unnecessary to spend a labor hour and a cost for controlling the ambient atmosphere. This makes it possible to easily perform the application of the energy.

In the above method, it is preferred that an average thickness of the bonding film is in the range of 100 nm to 100 μm.

This makes it possible to prevent dimensional accuracy of the bonded body obtained by bonding the first base member and the second base member together from being significantly lowered, thereby enabling to more firmly bond them together.

In the above method, it is preferred that at least a portion of the first base member which makes contact with the bonding film is composed of a silicon material, a metal material or a glass material as a major component thereof.

This makes it possible to improve bonding strength of the bonding film to each of the first and second base members, even if each of them is not subjected to a surface treatment.

In the above method, it is preferred that the second base member has a bonding film which is the same as the bonding film formed on the first base member, and in the bonding step, the first base member and the second base member are bonded together through the bonding films.

This makes it possible to obtain a bonded body having higher bonding strength between the first base member and the second base member.

It is preferred that the above bonding method further comprises subjecting the bonded body to a treatment for improving bonding strength between the first base member and the second base member after the bonding step.

This makes it possible to further improve the bonding strength between the first base member and the second base member.

In the above method, it is preferred that the treatment for improving the bonding strength is performed by at least one method selected from the group comprising a method in which an energy beam is irradiated on the bonding film and a method in which the bonding film is heated.

This makes it possible to further improve the bonding strength between the first base member and the second base member easily.

A second aspect of the present invention is directed to a bonded body of a semiconductor substrate and a semiconductor device to be mounted on the semiconductor substrate manufactured using the above method.

Such a bonded body can have high reliability.

DESCRIPTION OF EXEMPLARY EMBODIMENTS

Figure 1A:
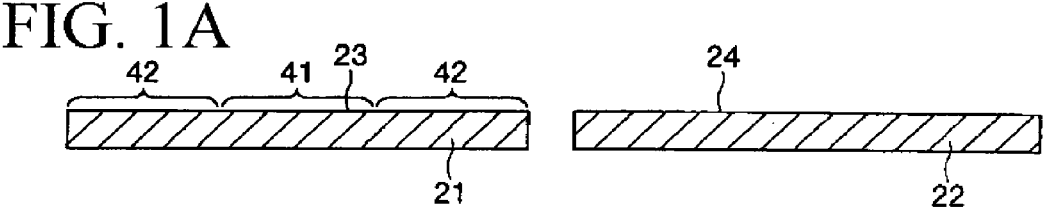
FIGS. 1A to 1E and 2F to 2H are sectional views for explaining a first embodiment of a method of manufacturing a bonded body (a bonding method) according to the present invention.

Hereinafter, a method of manufacturing a part of a MEMS including bonded body and a bonded body according to the present invention will be described in detail with reference to preferred embodiments shown in the accompanying drawings.

The method of manufacturing the part of the MEMS of the present invention is a method by which two base members (a first base member 21 and a second base member 22) are partially bonded together through a bonding film 3, 3a or 3b.

The bonding film 3, 3a or 3b is a film formed of a silicone material composed of silicone compounds as a major component thereof. Such a bonding film 3, 3a or 3b can develop a bonding property in a region of a surface thereof to which energy is applied.

By using the bonding film 3, 3a or 3b having such a property, it is possible to firmly bond the two base members 21 and 22 together with high dimensional accuracy and efficiently bond them together at a low temperature. Further, according to the present invention, it is possible to obtain a bonded body 1 having high reliability in which the two base members 21 and 22 are partially and firmly bonded together.

Method of Manufacturing Bonded Body

First Embodiment

First, description will be made on a first embodiment of the method of manufacturing the bonded body (a bonding method) of the present invention.

FIGS. 1A to 1E and 2F to 2H are sectional views for explaining the first embodiment of the method of manufacturing the bonded body according to the present invention. In this regard, it is to be noted that in the following description, an upper side in each of FIGS. 1A to 1E and 2F to 2H will be referred to as "upper" and a lower side thereof will be referred to as "lower".

The method of manufacturing the bonded body according to this embodiment comprises: preparing the first base member 21 having a bonding film formation region 41 where the bonding film is to be formed and a bonding film non-formation region 42 where the bonding film 3 is not to be formed, and the second base member (an adherend) 22; imparting liquid repellency for a liquid material 30 for forming the bonding film 3 to the bonding film non-formation region 42 to form a liquid repellent region thereon; supplying the liquid material 30 containing the silicone material onto the first base member 21 to selectively form a liquid coating 31 on the bonding film formation region 41; drying the liquid coating 31 to obtain the bonding film 3 on the bonding film formation region 41; applying energy to the bonding film 3 to develop the bonding property in a vicinity of a surface thereof; and laminating the first base member 21 and the second base member 22 (the adherend) together so that the second base member 22 makes close contact with the bonding film 3 to thereby obtain a bonded body 1 in which the base members 21 and 22 are partially bonded together through the bonding film 3.

Hereinafter, the method of manufacturing the bonded body according to this embodiment will be described one after another.

[1] First, the first base member 21 and the second base member 22 are prepared.

A constituent material of each of the first base member 21 and the second base member 22 is not particularly limited to a specific type. Examples of the constituent material of each of them include: a resin-based material such as polyolefin (e.g., polyethylene, polypropylene, ethylene-propylene copolymer, ethylene-vinyl acetate copolymer (EVA)), cyclic polyolefin, denatured polyolefin, polyvinyl chloride, polyvinylidene chloride, polystyrene, polyamide, polyimide, polyamide-imide, polycarbonate, poly-(4-methylpentene-1), ionomer, acrylic resin, polymethyl methacrylate, acrylonitrile-butadiene-styrene copolymer (ABS resin), acrylonitrile-styrene copolymer (AS resin), butadiene-styrene copolymer, polyoxymethylene, polyvinyl alcohol (PVA), ethylene-vinyl alcohol copolymer (EVOH), polyester (e.g., polyethylene terephthalate (PET), polyethylene naphthalate, polybutylene terephthalate (PBT), polycyclohexane terephthalate (PCT)), polyether, polyether ketone (PEK), polyether ether ketone (PEEK), polyether imide, polyacetal (POM), polyphenylene oxide, denatured polyphenylene oxide, polysulfone, polyether sulfone, polyphenylene sulfide, polyarylate, aromatic polyester (e.g., liquid crystal polymer), fluoro resin (e.g., polytetrafluoroethylene, polyfluorovinylidene), thermoplastic elastomer (e.g., styrene-based elastomer, polyolefin-based elastomer, polyvinylchloride-based elastomer, polyurethane-based elastomer, polyester-based elastomer, polyamide-based elastomer, polybutadiene-based elastomer, trans-polyisoprene-based elastomer, fluororubber-based elastomer, chlorinated polyethylene-based elastomer), epoxy resin, phenolic resin, urea resin, melamine resin, aramid resin, unsaturated polyester, silicone resin, polyurethane, or a copolymer, a blended body and a polymer alloy each having at least one of these materials as a major component thereof; a metal-based material such as a metal (e.g., Fe, Ni, Co, Cr, Mn, Zn, Pt, Au, Ag, Cu, Pd, Al, W, Ti, V, Mo, Nb, Zr, Pr, Nd, Sm), an alloy containing at least one of these metals, carbon steel, stainless steel, indium tin oxide (ITO) or gallium arsenide; a silicon-based material such as monocrystalline silicon, polycrystalline silicon or amorphous silicon; a glass-based material such as silicic acid glass (quartz glass), silicic acid alkali glass, soda lime glass, potash lime glass, lead (alkaline) glass, barium glass or borosilicate glass; a ceramic-based material such as alumina, zirconia, ferrite, silicon nitride, aluminum nitride, boron nitride, titanium nitride, carbon silicon, boron carbide, titanium carbide or tungsten carbide; a carbon-based material such as graphite; a complex material containing any one kind of the above materials or two or more kinds of the above materials; and the like.

Further, a surface of each of the first base member 21 and the second base member 22 may be subjected to a plating treatment such as a Ni plating treatment, a passivation treatment such as a chromate treatment, a nitriding treatment, or the like.

The constituent material of the first base member 21 may be different from or the same as that of the second base member 22.

It is preferred that the first base member 21 and the second base member 22 have substantially equal thermal expansion coefficients with each other. In the case where the first base member 21 and the second base member 22 have the substantially equal thermal expansion coefficients with each other, when the first base member 21 and the second base member 22 are bonded together, stress due to thermal expansion is less easily generated on a bonding interface therebetween (that is, in the bonding film 3). As a result, it is possible to reliably prevent occurrence of peeling in the bonded body 1 finally obtained.

As described in detail below, even if the first base member 21 and the second base member 22 have the different thermal expansion coefficients with each other, by optimizing conditions for bonding the first base member 21 and the second base member 22 in the step which will be described below, they can be firmly bond together with high dimensional accuracy.

Further, it is preferred that at least one of the two base members 21 and 22 is composed of a resin material. The base member composed of the resin material can be easily deformed due to plasticity of the resin material itself.

Therefore, it is possible to reduce stress which would be generated on the bonding interface between the two base members 21 and 22 (e.g., stress due to thermal expansion thereof) when they are bonded together through the bonding film 3.

As a result, breakage of the bonding interface becomes hard. This makes it possible to obtain a bonded body 1 having high bonding strength between the two base members 21 and (including bonding strength between the first base member 21 and the bonding film and bonding strength between the second base member 22 and the bonding film 3).

From the above viewpoint, it is preferred that at least one of the two base members 21 and 22 has flexibility. This makes it possible to obtain a bonded body 1 having improved bonding strength between the two base members 21 and 22.

In addition, in the case where the two base members 21 and 22 have flexibility, it is possible to obtain a bonded body 1 having flexibility as a whole thereof. Therefore, such a bonded body 1 can have high functionality.

Further, a shape of each of the base members 21 and may be a plate shape (a film shape), a massive shape (a blocky shape), a stick shape, or the like, as long as it has a shape with a surface which can support the bonding film 3.

In this embodiment, as shown in FIG. 1A, each of the base members 21 and 22 has the plate shape, a region other than a circumference region of an upper surface (a bonding surface 23) of the first base member 21 is defined as the bonding film formation region 41 where the bonding film 3 is to be formed.

Further, in the case where the base members 21 and 22 have the plate shape, respectively, they can be easily bent. Therefore, one of the base members 21 and 22 becomes sufficiently bendable (deformable) according to a shape of the other base member when they are laminated together. This makes it possible to improve the bonding strength between the base members 21 and 22 in the finally obtained bonded body 1.

In addition, since the base members 21 and 22 can be easily bent, stress which would be generated in the bonding interface therebetween can be reduced to some extent. In this case, an average thickness of each of the base members 21 and 22 is not particularly limited to a specific value, but is preferably in the range of about 0.01 to 10 mm, and more preferably in the range of about 0.1 to 3 mm.

Next, the bonding surface 23 of the first base member is subjected to a surface treatment for improving bonding strength between the first base member 21 and the bonding film 3, if needed.

By doing so, since the bonding surface 23 is cleaned and activated, the bonding film 3 can chemically affect the bonding surface 23 easily. As a result, in the subsequent step, when the bonding film 3 is formed on the bonding surface 23, it is possible to improve the bonding strength between the bonding film 3 and the first base member 21 (the bonding surface 23).

Such a surface treatment is not particularly limited to a specific type. Examples of the surface treatment include: a physical surface treatment such as a sputtering treatment or a blast treatment; a chemical surface treatment such as a plasma treatment performed using oxygen plasma and nitrogen plasma, a corona discharge treatment, an etching treatment, an electron beam irradiation treatment, an ultraviolet ray irradiation treatment or an ozone exposure treatment; a treatment performed by combining two or more kinds of these surface treatments; and the like.

In this regard, it is to be noted that in the case where the first base member 21 to be subjected to the surface treatment is formed of a resin material (a polymeric material), the corona discharge treatment, the nitrogen plasma treatment and the like are particularly preferably used.

Especially, by carrying out the plasma treatment or the ultraviolet ray irradiation treatment as the surface treatment, it is possible to more reliably clean and activate the bonding surface 23. As a result, the bonding strength between the first base member 21 and the bonding film 3 can be especially improved.

Depending on the constituent material of the first base member 21, the bonding strength of the bonding film 3 to the first base member 21 becomes sufficiently high even if the bonding surface 23 of the first base member 21 is not subjected to the surface treatment described above.

Examples of the constituent material of the first base member 21 with which such an effect is obtained include materials containing various kinds of the metal-based material, various kinds of the silicon-based material, various kinds of the glass-based material and the like as a major component thereof.

The surface of the first base member 21 formed of such materials is covered with an oxide film. In the oxide film, hydroxyl groups exist in a surface thereof. Therefore, by using the first base member 21 covered with such an oxide film, it is possible to improve the bonding strength between the first base member 21 (the bonding surface 23) and the bonding film 3 without subjecting the bonding surface 23 to the surface treatment described above.

In this regard, it is to be noted that in this case, the entire of the first base member 21 may not be composed of the above materials, as long as a vicinity of the bonding surface 23 of the first base member 21 is composed of the above materials.

Further, instead of the surface treatment, an intermediate layer may have been, in advance, provided on the bonding surface 23 of the first base member 21. This intermediate layer may have any function.

Such a function is not particularly limited to a specific kind. Examples of the function include: a function of improving the bonding strength of the first base member 21 to the bonding film 3; a cushion property (that is, a buffering function); a function of reducing stress concentration; and the like. By forming the bonding film 3 on such an intermediate layer, a bonded body 1 having high reliability can be obtained finally.

A constituent material of the intermediate layer include: a metal-based material such as aluminum or titanium; an oxide-based material such as metal oxide or silicon oxide; a nitride-based material such as metal nitride or silicon nitride; a carbon-based material such as graphite or diamond-like carbon; a self-organization film material such as a silane coupling agent, a thiol-based compound, a metal alkoxide or a metal halide; a resin-based material such as a resin-based adhesive agent, a resin filming material, a resin coating material, various rubbers or various elastomers; and the like, and one or more of which may be used independently or in combination.

Among intermediate layers composed of these various materials, use of the intermediate layer composed of the oxide-based material makes it possible to further improve the bonding strength between the first base member 21 and the bonding film 3 through the intermediate layer.

On the other hand, like the first base member 21, the bonding surface 24 of the second base member 22 may have been, in advance, subjected to a surface treatment for improving bonding strength between the second base member 22 (the bonding surface 24) and the bonding film 3, if needed. By doing so, the bonding surface 24 is cleaned and activated. As a result, it is possible to improve the bonding strength between the second base member 22 and the bonding film 3.

Such a surface treatment is not particularly limited to a specific type, but the same surface treatment as the above mentioned surface treatment, to which the bonding surface 23 of the first base member 21 is subjected, can be used.

Further, like the first base member 21, depending on the constituent material of the second base member 22, the bonding strength between the second base member 22 and the bonding film 3 becomes sufficiently high even if the bonding surface 24 is not subjected to the above surface treatment.

Examples of the constituent material of the second base member 22 with which such an effect is obtained include the above mentioned materials containing the various kinds of the metal-based material, the various kinds of the silicon-based material, the various kinds of the glass-based material and the like as the main material thereof.

The surface of the second base member 22 formed of such materials is covered with an oxide film. In the oxide film, hydroxyl groups exist in a surface thereof. Therefore, by using such a second base member 22 covered with the oxide film, it is possible to improve the bonding strength between the second base member 22 (the bonding surface 24) and the bonding film 3 without subjecting the bonding surface 24 to the surface treatment described above.

In this regard, it is to be noted that in this case, the entire of the second base member 22 may not be composed of the above materials, as long as at least a vicinity of the bonding surface 24 of the second base member 22 is composed of the above materials.

Furthermore, if the bonding surface 24 of the second base member 22 has the following groups and substances, the bonding strength between the second base member 22 and the bonding film 3 can become sufficiently high even if the bonding surface 24 is not subjected to the surface treatment described above.

Examples of such groups and substances include at least one group or substance selected from the group comprising various kinds of functional groups such as a hydroxyl group, a thiol group, a carboxyl group, an amino group, a nitro group and an imidazole group, various kinds of radicals, leaving intermediate molecules such as an open circular molecule and a molecule having at least one unsaturated (double or triple) bond, halogen such as F, Cl, Br or I, and peroxides, and dangling bonds (or uncoupled bonds) generated by leaving the above groups from atoms to which they had been bonded (that is, dangling bonds present in the atoms not terminated by leaving the above groups therefrom).

Among the leaving intermediate molecules, hydrocarbon molecules each including the open circular molecule or the unsaturated bond are preferably selected. Such hydrocarbon molecules affect the bonding film 3 based on marked reactivity thereof. Therefore, the second base member 22 having such hydrocarbon molecules on the bonding surface 24 thereof can be particularly firmly bonded to the bonding film 3.

Further, among the functional groups, the hydroxyl group is preferably selected. In the case where the bonding surface 24 has a plurality of the hydroxyl groups, it becomes possible for the second base member 22 to firmly bond to the bonding film 3 with ease.

By appropriately performing one selected from various surface treatment described above, the bonding surface 24 having such groups and substances can be obtained. This makes it possible to obtain a second base member 22 that can be firmly bonded to the bonding film 3.

Among them, it is preferred that the hydroxyl groups exist on the bonding surface 24 of the second base member 22. Such a bonding surface 24 and the surface of the bonding film 3 exposing the hydroxyl groups strongly attract with each other to form hydrogen bonds between the hydroxyl groups. This makes it possible to particularly firmly bond the first base member 21 and the second base member 22.

Further, like the first base member 21, instead of the surface treatment, a surface layer may have been, in advance, provided on the bonding surface 24 of the second base member 22. This surface layer may have any function, like in the case of the first base member 21.

Such a function is not particularly limited to a specific kind. Examples of the function include: a function of improving the bonding strength of the second base member 22 to the bonding film 3; a cushion property (that is, a buffering function); a function of reducing stress concentration; and the like. By bonding the second base member 22 and the bonding film through such a surface layer, a bonded body 1 having high reliability can be obtained finally.

As for a constituent material of such a surface layer, for example, the same material as the constituent material of the intermediate layer formed on the bonding surface 23 of the first base member 21 can be used.

In this regard, it is to be noted that the above mentioned surface treatment and formation of the intermediate may be carried out on the bonding film formation region 41, after the liquid repellent region 43 is formed on a base member on which the liquid repellent region 43 is to be formed (in this embodiment, the first base member 21) in the following step [2].

Further, such a surface treatment and formation of the intermediate and/or surface layer may be carried out, if necessary. For example, in the case where high bonding strength between the first base member 21 and the second base member 22 is not required, the surface treatment and formation of the intermediate and/or surface layer can be omitted.

[2] Next, the liquid repellency for the liquid material 30 containing the silicone material, which is to be supplied onto the bonding surface 23 of the first base member 21 in the following step [3], is imparted to the bonding film non-formation region 42 to thereby form the liquid repellent region thereon. In this regard, the bonding film non-formation region 42 is a region other than the bonding film formation region 41 of the bonding surface 23 and is provided so as to be adjacent to the bonding film formation region 41.

In this regard, in this specification, the term "the liquid repellency for the liquid material 30 containing the silicone material" means low wettability for the liquid material 30 containing the silicone material.

Specifically, a contact angle of the liquid material 30 with respect to the liquid repellent region 43 is preferably 90° or more, and more preferably 110° or more. This makes it possible for the liquid repellent region 43 to exhibit sufficient high liquid repellency for the liquid material 30.

Figure 1B:
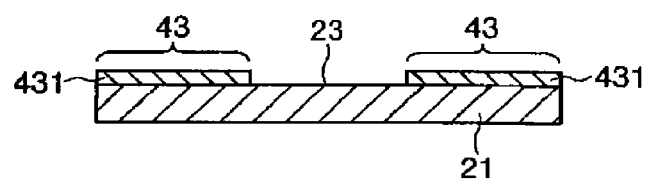

The liquid repellency can be imparted to the bonding film non-formation region 42 using <I> a method in which liquid repellent functional groups each having the liquid repellency for the liquid material 30 are introduced to the above region 42, <II> a method in which, as shown in FIG. 1B, a liquid repellent film 431 having the liquid repellency for the liquid material 30 is formed on the above region 42, or the like.

Hereinafter, these methods <I> and <II> will be described one after another.

<I> The method in which the liquid repellent functional groups are introduced to the bonding film non-formation region 42 is not particularly limited to a specific kind, but examples of the method include a plasma treatment in which a treatment gas is activated (ionized or excited) by discharging it to generate plasma, and then the plasma is emitted on the bonding film non-formation region 42, and the like.

As the treatment gas for imparting the liquid repellency to the bonding film non-formation region 42 of the first base member 21, a fluorine atom-containing compound gas such as $CF_4$, $C_2F_6$, $C_3F_6$, $CClF_3$ and $SF_6$ can be used.

By using such a fluorine atom-containing compound gas as the treatment gas, fluorine atom-containing functional groups such as fluoroalkyl groups are introduced to the bonding film non-formation region 42. As a result, the bonding film non-formation region 42 can exhibit excellent liquid repellency for the liquid material 30.

In the case where the liquid material 30 containing the silicone material has water repellency (hydrophobicity), the bonding film non-formation region 42 can have the liquid repellency for the liquid material 30 by imparting water wettability (hydrophilicity) thereto.

In this case, as a treatment gas for imparting the water wettability to the bonding film non-formation region 42 of the first base member 21, an oxygen atom-containing gas such a $O_3$ gas, a $H_2O$ gas or air, a nitrogen atom-containing gas such a $N_2$ gas or a $NH_3$ gas and a sulfur atom-containing gas such a $SO_2$ gas or a $SO_3$ gas can be used.

By using such a gas as the treatment gas, water wettable functional groups (hydrophilic functional groups) such as carbonyl groups, hydroxyl groups and amino groups can be introduced to the bonding film non-formation region 42. This makes it possible to make surface energy of the bonding film non-formation region 42 high.

As a result, a water wettable surface (a hydrophilic surface), that is, the liquid repellent region 43 exhibiting the liquid repellency for the liquid material 30 can be formed on the bonding film non-formation region 42.

In this regard, such a plasma treatment can be carried out by placing a mask provided with a window portion having a shape corresponding to that of the bonding film non-formation region 42 on the first base member 21, and then emitting the plasma, which is generated using the above treatment gas, on the bonding film non-formation region 42 through the mask.

By doing so, the plasma makes contact with the bonding film non-formation region 42 selectively so that the liquid repellency for the liquid material 30 can be formed thereon.

<II> Examples of the liquid repellent film 431 to be formed on the bonding film non-formation region 42 include a self-assembled monomolecular (SAM) film formed using molecules each having at least one bonding functional group that can be reacted with an atom existing in the vicinity of the bonding surface 23 of the first base member 21 which is a foundation of the liquid repellent film 431, a plasma polymerization film and the like.

By forming the liquid repellent film 431 from such a film, it is possible to effectively obtain a dense and homogeneous liquid repellent film 431. The self-assembled film having the liquid repellency can be formed by supplying molecules each having the at least one bonding functional group and at least one liquid repellent functional group onto the bonding film non-formation region 42 of the first base member 21, and bonding the molecules to the bonding film non-formation region 42 through the bonding functional group.

Hereinafter, the molecule having the bonding functional group and the repellent functional group will be described. Here, the above self-assembled film is a film which is formed with the above molecules assembling autonomously on a surface of solid.

The bonding functional group is a functional group for bonding to the surface of the solid (the bonding surface 23 of the first base member 21). It is preferred that the molecule has a plurality of the bonding functional groups. In this case, the molecule can be firmly bonded to the bonding film non-formation region 42 of the first base member 21 via the plurality of bonding functional groups.

The bonding functional group is not particularly limited to a specific type, as long as it can be bonded to the first base member 21.

For example, in the case where the base member 21 is formed of the various kinds of metal-based materials, the various kinds of silicon-based materials, the various kinds of glass-based materials or the like as a major component thereof, and the hydroxyl groups are exposed on the bonding surface 23 thereof, a bonding functional group including a hydrolysable group such as an alkoxy group or a halogen group, an amino group or the like is preferably selected.

Further, in the case where the base member 21 is formed of noble metal as a major component thereof, a bonding functional group including a thiol group is preferably selected.

In addition, in the case where the molecule has the plurality of bonding functional groups, it is preferred that the bonding functional groups include at least one hydrolysable group. In this case, the molecules can be not only bonded to the bonding film non-formation region 42 of the first base member 21, but also bonded together via the hydrolysable groups.

This makes it possible to form network-like bonds (a network structure) due to bonding between the molecules on the bonding film non-formation region 42 of the first base member 21. Therefore, the formed liquid repellent film 431 can become more dense. As a result, the liquid repellent film 431 can have especially high liquid repellency and improve a bonding force thereof with respect to the bonding film non-formation region 42 of the first base member 21.

On the other hand, examples of the repellent functional group include a functional group including a fluoroalkyl group, an alkyl group, a vinyl group or the like. Among them, the functional group including the fluoroalkyl group is especially preferably selected. This is because the functional group including the fluoroalkyl group has especially excellent liquid repellency.

A weight average molecular weight of the repellent functional group is preferably in the range of about 200 to 4,000, and more preferably in the range of about 1,000 to 2,000.

Considering the above matters, in the case where the hydroxyl groups are exposed on the bonding surface 23 of the first base member 21, various kinds of metal alkoxides each having the functional group including the fluoroalkyl group and a metal atom such as Ti, Li, Si, Na, K, Mg, Ca, St, Ba, Al, In, Ge, Bi, Fe, Cu, Y, Zr or Ta are preferably used as the molecule for forming the self-assembled film.

Among them, in general, coupling agents (metal alkoxides) each having the functional group including the fluoroalkyl group and the metal atom such as Si, Ti or Al are more preferably used. Especially, a silane-based coupling agent (a metal alkoxide) having the functional group including the fluoroalkyl group and Si is preferably used.

This is because the silane-based coupling agent having the functional group including the fluoroalkyl group is chemically stable, and is available with ease for a reason that it is low in price.

Here, the silane-based coupling agent having the functional group including the fluoroalkyl group is represented by a general formula: $R_n SiX_{(4-n)}$, wherein the X is a hydrolysable group that can produce a silanol group by hydrolysis thereof, and the n is an integer of 1 to 3 and preferably an integer of 1 or 2. In the general formula, examples of the X include a methoxy group, an ethoxy group, a halogen group and the like.

In this regard, each of the Rs or each of the Xs bonded to a single Si atom may be the same or different from each other. Concrete examples of the silane-based coupling agent having the functional group including the fluoroalkyl group include tridecafluoro-1,1,2,2-tetrahydrooctyl triethoxysilane, tridecafluoro-1,1,2,2-tetrahydrooctyl trimethoxysilane, tridecafluoro-1,1,2,2-tetrahydrooctyl trichlorosilane, trifluoropropyl trimethoxysilane and the like.

Further, although the self-assembled film can be formed using a vapor phase process, a liquid phase process or the like, it is preferred that the self-assembled film is formed using the liquid phase process. By using the liquid phase process, the self-assembled film can be reliably formed trough a relatively simple process in which a treatment liquid containing the above molecules is prepared, this treatment liquid is supplied onto the bonding film non-formation region 42 of the first base member 21, and then the treatment liquid is, if needed, subjected to a post-treatment such as a heating treatment.

Examples of a method of supplying the treatment liquid onto the bonding film non-formation region 42 of the first base member 21 include various kinds of application methods such as an ink jet method, a spin coating method, a casting method, a micro-gravure coating method, a gravure coating method, a bar coating method, a roll coating method, a wire-bar coating method, a dip coating method, a spray coating method, a screen printing method, a flexo printing method, an offset printing method, a micro-contact printing method, and the like, one of these methods may be used independently or two or more of these methods may be used in combination.

Among them, it is preferred that the ink jet method is used. According to the ink jet method, it is possible to selectively and relatively easily supply the treatment liquid onto the bonding film non-formation region 42 of the first base member 21 with excellent accuracy.

Further, the post-treatment is carried out, for example, for the purpose of progressing reaction between the bonding functional group and the bonding surface 23 of the first base member 21.

Hereinafter, description will be made on a case that the silane-based coupling agent having the functional group including the fluoroalkyl group is used as the molecule.

In this case, when a treatment liquid containing the silane-based coupling agents is selectively supplied onto the bonding film non-formation region 42 of the first base member 21 using, for example, the ink jet method, and then the treatment liquid is heated trough the first base member 21, the hydrolysable groups of the silane-based coupling agents are hydrolyzed to generate the silanol groups, and the generated silanol groups are reacted with hydroxyl groups exposing on the bonding surface 23 of the first base member 21 to form siloxane bonds.

In this way, a liquid repellent film 431 having a shape corresponding to that of the bonding film non-formation region 42 is formed on the bonding surface 23 of the first base member 21. In such a liquid repellent film 431, the liquid repellent functional groups are exposed on a surface (an opposite surface from the first base member 21) thereof. As a result, the liquid repellent film 431 can exhibit the liquid repellency for the liquid material 30.

On the other hand, the plasma polymerization film can be formed on the bonding film non-formation region 42 of the first base member 21 by activating gas molecules constituting a raw gas by plasma, and polymerizing the activated gas molecules near the bonding film non-formation region 42.

Examples of the raw gas for forming the plasma polymerization film having the liquid repellency include a fluorine-based gas such as a $CHF_3$ gas, a $C_2F_4$ gas, a $C_2F_6$ gas or a $C_4F_8$ gas. Gas molecules constituting the fluorine-based gas are polymerized by a plasma polymerization so that a dense polymerized matter containing fluorine atoms can be formed.

Among them, a fluorine-based gas containing at least one kind of the $CHF_3$ gas, the $C_2F_6$ gas and the $C_4F_8$ gas as a major component thereof is preferably used. This is because gas molecules constituting such a fluorine-based gas can be easily polymerized by the plasma polymerization to thereby form a dense polymerized matter having excellent liquid repellency.

Further, since an amount of fluorine atoms contained in each of gas molecules constituting the fluorine-based gas is large, it is possible to obtain a polymerized matter having higher liquid repellency.

In this regard, the raw gas may be composed of a gas generated by vaporizing a raw liquid containing fluorine atoms as a major component thereof. There is an advantage that such a raw liquid is easy to use.

In the case where the liquid material 30 containing the silicone material has water repellency (hydrophobicity), the bonding film non-formation region 42 can have the liquid repellency for the liquid material 30 by forming a plasma polymerization film having water wettability (hydrophilicity) thereon.

Examples of a raw gas for forming the plasma polymerization film having the water wettability include a gas produced by vaporizing monomers each having a water wettable group such as acrylic acid monomers each having the water wettable group and methacrylic acid monomers each having the water wettable group.

Such a plasma polymerization film can be formed on the bonding film non-formation region 42 of the first base member 21 by placing a mask provided with a window portion having a shape corresponding to that of the bonding film non-formation region 42 on the first base member 21, and then plasma polymerizing the above mentioned raw gas on the bonding film non-formation region 42 through the mask.

In this way, the plasma polymerization film is selectively formed on the bonding film non-formation region 42 so that the liquid repellent film 431 is obtained thereon.

Further, in an alternative method, the plasma polymerization film is formed on the entire of the bonding surface 23 of the first base member 21, a mask provided with a window portion having an opposite shape from that of the bonding film non-formation region 42 (a shape corresponding to that of the bonding film formation region 41) is placed on the plasma polymerization film, and then the plasma polymerization film is etched through the mask.

In this way, the plasma polymerization film is etched so as to have the shape corresponding to that of the bonding film non-formation region 42 to thereby obtain the liquid repellent film 431 which selectively covers the bonding film non-formation region 42.

Examples of a method of etching the plasma polymerization film to be used in this case include various kinds of etching methods such as a dry etching method (e.g., a plasma etching method) and a wet etching method, but the plasma etching method is preferably used.

Use of the plasma etching method makes it possible to perform patterning of the plasma polymerization film while preventing contamination of the plasma polymerization film, the first base member 21 and the like.

As a gas for etching (an etchant) to be used in the plasma etching method, a fluorine-based gas is preferably used, and a gas containing a $CF_4$ gas as a major component thereof is more preferably used. Molecules constituting the $CF_4$ gas are easily dissociated into a carbon atom and fluorine atoms, when performing the plasma etching, to generate activated species (activated molecules).

Due to an action (e.g., a reaction or a collision) of these activated species with respect to the plasma polymerization film (a polymerized matter), an unnecessary portion thereof is removed so that the plasma polymerization film can be effectively patterned.

In addition, in this case, when the plasma etching is carried out, the fluorine atoms are newly introduced into the plasma polymerization film. Therefore, it is possible to improve the liquid repellency of the obtained liquid repellent film 431. Namely, it is possible to impart more high liquid repellency to the bonding film non-formation region 42 of the first base member 21.

By using the above methods <I> and <I>, the liquid repellency is imparted to the bonding film non-formation region of the first base member 21 to thereby form the liquid repellent region 43 thereon. According to these methods, even if the bonding film non-formation region 42 has a complex pattern (shape), the liquid repellent region 43 can be easily formed thereon.

In this regard, in this embodiment, the liquid repellent region 43 is formed so as to surround the bonding film formation region 41.

In the case where the liquid repellent region 43 has such a pattern (shape), the liquid material 30 supplied onto the bonding surface 23 of the first base member 21 can reliably stay within the bonding film formation region 41 to thereby form the liquid coating 31. In this way, it is possible to reliably form a liquid coating 31 having a shape corresponding to that of the bonding film formation region 41.

Although such a liquid repellency is imparted to the bonding film non-formation region 42 of the first base member 21 to thereby form the liquid repellent region 43 thereon, it is also preferred that liquid wettability for the liquid material is imparted to the bonding film formation region 41 of the first base member 21.

When the liquid material 30 is supplied onto the bonding surface 23 in the step which will be described below, the liquid material 30 is repelled due to the liquid repellency of the liquid repellent region 43 while being gathered onto the bonding film formation region 41 due to the liquid wettability thereof. As a result, the liquid material 30 can be selectively supplied onto the bonding film formation region 41.

Namely, it is preferred that the bonding film formation region 41 and the bonding film non-formation region 42 have different affinities with respect to the liquid material 30 with each other by appropriately selecting treatments to which the two regions 41 and 42 are to be subjected.

Examples of a method of imparting the liquid wettability to the bonding film formation region 41 include a method in which liquid wettable functional groups (a liquid wettable substance) are introduced into the bonding film formation region 41 to thereby impart the liquid wettability thereto, a method in which a liquid wettable film is formed on the bonding film formation region 41, and the like.

The liquid wettable functional groups are appropriately selected depending on a property of the liquid material 30. In the case where the liquid material 30 has hydrophobicity, a hydrophobic functional group such as an alkyl group (e.g., a methyl group, an ethyl group, an isopropyl group, a butyl group or an isobutyl group) and an aryl group (e.g., a phenyl group or a naphthyl group) is selected. On the other hand, in the case where the liquid material 30 has hydrophilicity, a hydrophilic functional group such as a hydroxyl group, a carbonyl group and an amino group is selected.

A method of introducing such a hydrophobic or hydrophilic functional group to the bonding film formation region 41 is not particularly limited to a specific kind, as long as the functional groups can be introduced thereto by utilizing application of energy, but examples of the method include a plasma treatment in which a treatment gas is activated (ionized or excited) by discharging it to generate plasma, and then the plasma is emitted on the bonding film formation region 41, and the like.

Further, by subjecting the bonding film formation region 41 to an oxidation treatment, the hydroxyl groups can be easily introduced thereto. The oxidation treatment can be carried out using a simple method such as a method in which the bonding film formation region 41 of the first base member 21 is heated or a method in which an ultraviolet ray is irradiated on the bonding film formation region 41 of the first base member 21.

Alternatively, the liquid wettability may be imparted to the bonding film formation region 41 by forming a coating having hydrophilicity or hydrophobicity thereon. Such a coating can be formed from, for example, a self-assembled film, a plasma polymerization film or the like.

Further, irregularities may be formed on the bonding film formation region 41 by subjecting it to a surface roughening treatment. In this case, since adhesion of the liquid material 30 with respect to bonding film formation region is enhanced due to existence of the irregularities, it is also possible to impart the liquid wettability for the liquid material 30 to the bonding film formation region 41. Examples of the surface roughening treatment include a sputtering treatment, a blast treatment and the like.

Figure 1C:
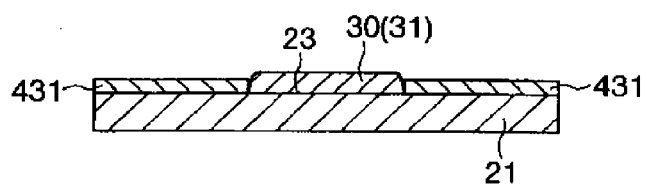

[3] Next, as shown in FIG. 1C, the liquid material 30 containing the silicone material is supplied onto the bonding surface 23 of the first base member 21 to form the liquid coating 31 on the bonding film formation region 41.

As a method of supplying the liquid material 30, the same method as described in the above step [2] can be used. In this regard, by appropriately adjusting an amount of the liquid material 30 to be supplied onto the bonding surface 23 at this time, it is possible to relatively easily control a thickness of the bonding film 3 to be formed.

When the liquid material 30 is supplied onto the bonding surface 23 of the first base member 21, since the liquid repellent region 43 is formed on the bonding film non-formation region 42, the liquid material 30 hardly adheres to the bonding film non-formation region 42 by repelling it due to the liquid repellency thereof.

On the other hand, the liquid material 30 directly supplied onto the bonding film formation region 41 adheres thereto. Further, the liquid material 30 repelled due to the liquid repellency of the bonding film non-formation region 42 moves toward the bonding film formation region 41 and also adheres thereto.

Namely, the liquid material 30 is self-aligned so that a liquid coating 31 having a pattern (shape) corresponding to that of the bonding film formation region 41 is selectively formed on the bonding surface 23 of the first base member 21.

In the case where the liquid repellency for the liquid material 30 is imparted to the bonding film non-formation region 42, even if the liquid material 30 is supplied onto the entire of the bonding surface 23 of the first base member 21, it can autonomously and selectively adhere to the bonding film formation region 41.

Therefore, even if an application method such as a spin coating method, which is relatively easily used but is difficult to control a region where a liquid material is to be supplied, is used, a liquid coating 31 having a predetermined shape can be formed without a mask or the like. For this reason, a step of forming the liquid coating 31 can be simplified and a time required for forming the liquid coating 31 can be shortened.

Further, even if a large amount of the liquid material 30 is supplied onto the bonding film formation region 41, the liquid material 30 hardly flows toward the bonding film non-formation region 42. This makes it possible to prevent extension of the liquid coating 31. As a result, a thickness of the finally obtained bonding film 3 becomes larger.

Furthermore, the liquid coating 31 can be also formed by performing the above step several times. This makes it possible to further extend a controllable range of the thickness of the bonding film 3. This also makes it possible to control the thickness and shape of the bonding film 3 with high accuracy.

Here, the liquid material 30 contains the silicone material composed of the silicone compounds.

"silicone material" means a material composed of silicone compounds (molecules) each having a polyorganosiloxane chemical structure, that is, silicone compounds each having a main chemical structure (a main chain) mainly constituted of organosiloxane repeating units.

Each of the silicone compounds contained in the silicone material may have a branched chemical structure including a main chain and side chains each branched therefrom, a ringed chemical structure in which the main chain forms a ring shape, or a straight chemical structure in which both ends of the main chain are not bonded together.

In each silicone compound having the polyorganosiloxane chemical structure, for example, an organosiloxane repeating unit constituting each end portion of the polyorganosiloxane chemical structure is a repeating unit represented by the following general formula (1), an organosiloxane repeating unit constituting each connecting portion of the polyorganosiloxane chemical structure is a repeating unit represented by the following general formula (2), and an organosiloxane repeating unit constituting each branched portion of the polyorganosiloxane chemical structure is a repeating unit represented by the following general formula (3).

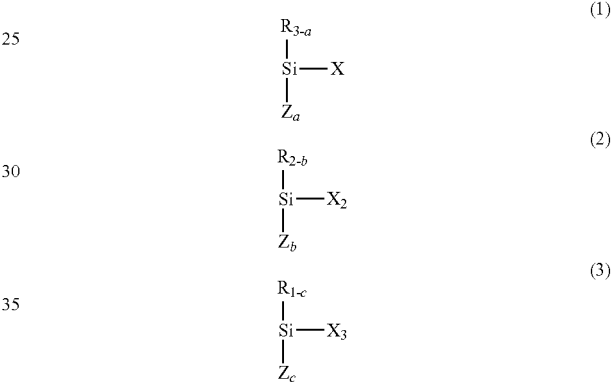

wherein in the general formulas (1) to (3), each of the Rs is independently a substituted hydrocarbon group or an unsubstituted hydrocarbon group, each of the Zs is independently a hydroxyl group or a hydrolysable group, each of the Xs is a siloxane residue, the a is 0 or an integer of 1 to 3, the b is 0 or an integer of 1 to 2, and the c is 0 or 1.

In this regard, the siloxane residue means a substituent group which is bonded to a silicon atom contained in an adjacent repeating unit via an oxygen atom to thereby form a siloxane bond. Specifically, the siloxane residue is a chemical structure of —O— (Si), wherein the Si is the silicon atom contained in the adjacent repeating unit.

In each silicone compound, the polyorganosiloxane chemical structure is preferably the straight chemical structure, that is, a chemical structure constituted of the repeating units each represented by the above general formula (1) and the repeating units each represented by the above general formula (2).

In the case where a silicone material composed of such silicone compounds is used, since in the following step, the silicone compounds are tangled together in the liquid material 30 (the liquid coating 31) so that the bonding film 3 is formed, the thus formed bonding film 3 can have excellent film strength.

Specifically, examples of the silicone compound having such a polyorganosiloxane chemical structure include a silicone compound represented by the following general formula (4).

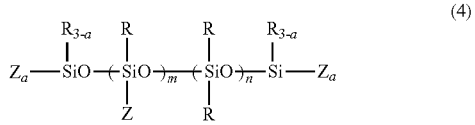

(4)

Wherein in the general formula (4), each of the Rs is independently a substituted hydrocarbon group or an unsubstituted hydrocarbon group, each of the Zs is independently a hydroxyl group or a hydrolysable group, the a is 0 or an integer of 1 to 3, the m is 0 or an integer of 1 or more, and the n is 0 or an integer of 1 or more.

In the general formulas (1) to (4), examples of the R (the substituted hydrocarbon group or unsubstituted hydrocarbon group) include: an alkyl group such as a methyl group, an ethyl group or a propyl group; a cycloalkyl group such as a cyclopentyl group or a cyclohexyl group; an aryl group such as a phenyl group, a tolyl group or a biphenylyl group; and an aralkyl group such as a benzyl group or a phenyl ethyl group.

Further, in the above groups, a part of or all of hydrogen atoms bonding to carbon atom(s) may be respectively substituted by I) a halogen atom such as a fluorine atom, a chlorine atom or a bromine atom, II) an epoxy group such as a glycidoxy group, III) a (meth)acryloyl group such as an methacryl group, IV) an anionic group such as a carboxyl group or a sulfonyl group, and the like.

Examples of the hydrolysable group include: an alkoxy group such as a methoxy group, an ethoxy group, a propoxy group, a butoxy group; a ketoxime group such as a dimethyl ketoxime group or a methyl ethyl ketoxime group; an acyloxy group such as an acetoxy group; an alkenyloxy group such as an isopropenyloxy group or an isobutenyloxy group; and the like.

Further, in the general formula (4), the m and n represent a degree of polymerization of the polyorganosiloxane chemical structure. The total number of the m and n (that is, m+n) is preferably an integer of about 5 to 10,000, and more preferably an integer of about 50 to 1,000. By setting the degree of the polymerization to the above range, a viscosity of the liquid material 30 can be relatively easily adjusted to a range which will be described below.

Among various kinds of the silicone materials, it is preferable to use a silicone material composed of silicone compounds each having a polydimethylsiloxane chemical structure (that is, a chemical structure represented by the above general formula (4) in which the Rs are the methyl groups) as a main chemical structure thereof. Such silicone compounds can be relatively easily available at a low price.

Further, such silicone compounds can be preferably used as a major component of the silicone material because the methyl groups are easily broken and removed from their chemical structures by applying energy. Therefore, in the case where the bonding film 3 contains such a silicone material, when applying the energy to the bonding film 3 in the subsequent step, it is possible for the bonding film 3 to reliably develop the bonding property.

In addition, it is preferred that each of the silicone compounds has at least one silanol group. Specifically, it is preferable to use silicone compounds each having a chemical structure represented by the above general formula (4) in which the Zs are the hydroxyl groups.

In the case where the bonding film 3 is formed using the silicone material composed of such silicone compounds, when drying the liquid coating 30 to transform it into the bonding film 3 in the following step, the hydroxyl groups (included in the silanol groups) of the adjacent silicone compounds are bonded together. Therefore, the thus formed bonding film 3 can have more excellent film strength.

In addition, in the case where the first base member 21 described above, in which the hydroxyl groups are exposed on the bonding surface 23, is used, the hydroxyl groups (included in the silanol groups) of the silicone compounds and the hydroxyl groups present in the first base member 21 are bonded together.

As a result, the silicone compounds can be bonded to the bonding surface 23 not only through physical bonds but also through chemical bonds. This makes it possible for the bonding film 3 to be firmly bonded to the bonding surface 23 of the first base member 21.

Further, the silicone material is a material having relatively high flexibility. Therefore, even if the constituent material of the first base member 21 is different from that of the second base member 22, when the bonded body 1 is obtained by bonding them together through the bonding film 3 in the subsequent step, the bonding film 3 can reliably reduce stress which would be generated between the first and second base members 21 and 22 due to thermal expansions thereof. As a result, it is possible to reliably prevent occurrence of peeling in the bonded body 1 finally obtained.

Since the silicone material also has excellent chemical resistance, it can be effectively used in bonding members, which are exposed to chemicals for a long period of time, together. Specifically, for example, the bonding film 3 according to the present invention can be used in manufacturing a liquid droplet ejection head of a commercial ink jet printer in which an organic ink being apt to erode a resin material is employed. This makes it possible to reliably improve durability of the liquid droplet ejection head.

In addition, since the silicone material has excellent heat resistance, it can also be effectively used in bonding members, which are exposed to a high temperature, together.

A viscosity (at 25° C.) of the liquid material 30 is, generally, preferably in the range of about 0.5 to 200 mPa·s, and more preferably in the range of about 3 to 20 mPa·s.

By adjusting the viscosity of the liquid material 30 to the range noted above, even if the liquid material 30 is supplied onto the liquid repellent region 43 (the bonding film non-formation region 42), it rapidly moves toward the bonding film formation region 41 and is accumulated thereon. As a result, it is possible to selectively obtain a liquid coating 31 having a correct shape corresponding to that of the bonding film formation region 41.

Further, in this case, since the liquid material 30 can have a relatively high viscosity, it is possible to form a liquid coating 31 having a thicker thickness. In addition, such a liquid material 30 can contain a sufficient amount of the silicone material therein. Therefore, by drying the liquid coating 31 formed of such a liquid material 30 in the following step [4], the bonding film 3 can be formed reliably.

In this regard, if the viscosity of the liquid material 30 is lower than the lower limit value, flowability thereof becomes remarkably high. As a result, there is a fear that the liquid material 30 flows toward the bonding film non-formation region 42 from the bonding film formation region 41.

On the other hand, if the viscosity of the liquid material 30 exceeds the upper limit value, the flowability thereof becomes low. As a result, there is a fear that accuracy of the thickness and shape of the liquid coating 31 is remarkably lowered.

As described above, although the liquid material 30 contains the silicone material, in the case where the silicone material itself is in the form of liquid and has a required viscosity range, the silicone material can be used as the liquid material 30 directly. On the other hand, in the case where the silicone material itself is in the form of solid or liquid having a high viscosity, a solution or dispersion liquid containing the silicone material can be used as the liquid material 30.

Examples of a solvent dissolving the silicone material or a dispersion medium for dispersing the same include: various kinds of inorganic solvents such as ammonia, water, hydrogen peroxide, carbon tetrachloride and ethylene carbonate; various kinds of organic solvents such as ketone-based solvents (e.g., methyl ethyl ketone (MEK) and acetone), alcohol-based solvents (e.g., methanol, ethanol and isopropanol), ether-based solvents (e.g., diethyl ether and diisopropyl ether), cellosolve-based solvents (e.g., methyl cellosolve), aliphatic hydrocarbon-based solvents (e.g., hexane and pentane), aromatic hydrocarbon-based solvents (e.g., toluene, xylene and benzene), aromatic heterocycle compound-based solvents (e.g., pyridine, pyrazine and furan), amide-based solvents (e.g., N,N-dimethylformamide), halogen compound-based solvents (dichloromethane and chloroform), ester-based solvents (e.g., ethyl acetate and methyl acetate), sulfur compound-based solvents (e.g., dimethyl sulfoxide (DMSO) and sulfolane), nitrile-based solvents (e.g., acetonitrile, propionitrile and acrylonitrile), organic acid-based solvents (e.g., formic acid and trifluoroacetic acid); mixture solvents each containing at least one kind of the above solvents; and the like.

Figure 1D:
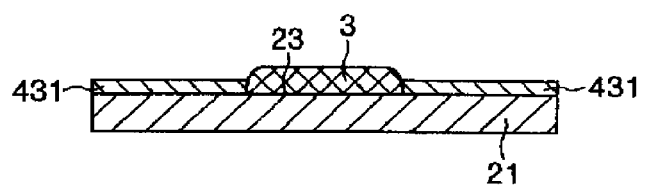

[4] Next, the liquid coating 31 formed on the bonding film formation region 41 of the first base member 21 is dried. In this way, as shown in FIG. 1D, a bonding film 3 having a predetermined pattern which is of a shape corresponding to that of the bonding film formation region 41 is formed.

The bonding film 3 formed in this way can develop a bonding property when applying energy thereto. Further, in the case where the silicone material composed of the silicone compounds each having the at least one silanol group is used, the hydroxyl groups included in the silanol groups of the silicone compounds are reliably bonded together.

In addition, such hydroxyl groups and the hydroxyl groups present in the first base member 21 are reliably bonded together. For these reasons, the thus formed bonding film 3 can have excellent film strength and be firmly bonded to the first base member 21.

A drying temperature of the liquid coating 31 is preferably 25° C. or higher, and more preferably in the range of about 25 to 100° C. Further, a drying time of the liquid coating 31 is preferably in the range of about 0.5 to 48 hours, and more preferably in the range of about 15 to 30 hours.

An ambient pressure in drying the liquid coating 31 may be an atmospheric pressure, but is preferably a reduced pressure. Specifically, a degree of the reduced pressure is preferably in the range of about $133.3 \times 10^{-5}$ to 1,333 Pa ($1 \times 10^{-5}$ to 10 Torr), and more preferably in the range of about $133.3 \times 10^{-4}$ to 133.3 Pa ($1 \times 10^{-4}$ to 1 Torr).

This makes it possible to progress the drying of the liquid coating 31. Further, this also makes it possible to improve density of the bonding film 3, that is, the bonding film 3 can become dense. As a result, the bonding film 3 can have more excellent film strength.

In this way, by appropriately controlling the conditions in forming the bonding film 3, it is possible to form a bonding film 3 having a desired film strength and the like.

An average thickness of the bonding film 3 is preferably in the range of about 100 nm to 100 μm, and more preferably in the range of about 200 nm to 10 μm. By setting the average thickness of the formed bonding film 3 to the above range, it is possible to prevent dimensional accuracy of the bonded body 1 obtained by bonding the first base member 21 and the second base member 22 together from being significantly lowered, thereby enabling to firmly bond them together.

In this regard, setting of the average thickness of the bonding film 3 can be performed by appropriately controlling an amount of the liquid material 30 to be supplied onto the first base member 21.

In this regard, if the average thickness of the bonding film 3 is lower than the above lower limit value, there is a case that the bonded body 1 having sufficient bonding strength between the first base member 21 and the second base member 22 cannot be obtained. In contrast, if the average thickness of the bonding film 3 exceeds the above upper limit value, there is a fear that dimensional accuracy of the bonded body 1 is lowered significantly.

Further, by setting the average thickness of the bonding film 3 to the above range, the bonding film 3 can have a certain degree of elasticity. Therefore, when the first base member 21 and the second base member 22 are bonded together, even if particles or the like adhere (exist) on the bonding surface 24 of the second base member 22 which makes contact with the bonding film 3, the bonding film 3 takes into the particles so that it can reliably bond to the second base member 22.

As a result, it is possible to reliably suppress or prevent reduction of the bonding strength between the bonding film 3 and the second base member 22 and occurrence of peeling of the bonding film 3 from the second base member 22 in an interface thereof, due to the existence of the particles.

[5] Next, the energy is applied to the bonding film 3. When the energy is applied to the bonding film 3, a part of molecular bonds of the silicone compounds present in the vicinity of the surface of the bonding film 3 are broken. As a result, the surface is activated due to breakage of the molecular bonds. Namely, the bonding property with respect to the second base member 22 is developed in the vicinity of the surface of the bonding film 3.

The first base member 21 having the bonding film 3 in such a state can be firmly bonded to the second base member 22 based on chemical bonds.

Here, in this specification, a state that the surface of the bonding film 3 is "activated" means: a state that a part of the molecular bonds of the silicone compounds present in the vicinity of the surface are broken as described above, e.g., a part of the methyl groups are broken and removed from the polydimethylsiloxane chemical structure, and a part of the silicon atoms are not terminated so that "dangling bonds (or uncoupled bonds)" are generated on the surface; a state that the silicon atoms having the dangling bonds (the unpaired electrons) are terminated by hydroxyl groups (OH groups) so that the hydroxyl groups exist on the surface; and a state that the dangling bonds and the hydroxyl groups coexist on the surface.

The energy may be applied to the bonding film 3 by any method. Examples of the method include: a method in which an energy beam is irradiated on the bonding film 3; a method in which the bonding film 3 is heated; a method in which a compressive force (physical energy) is applied to the bonding film 3; a method in which the bonding film 3 is exposed to plasma (that is, plasma energy is applied to the bonding film 3); a method in which the bonding film 3 is exposed to an ozone gas (that is, chemical energy is applied to the bonding film 3); and the like.

This makes it possible to effectively activate the surface of the bonding film 3. This also makes it possible to prevent excessive breakage of the molecular bonds of the silicone compounds contained in the bonding film 3. Therefore, it is possible to prevent a property of the bonding film 3 from being lowered.

Among the above methods, in this embodiment, it is particularly preferred that the method in which the energy beam is irradiated on the bonding film 3 is used as the method in which the energy is applied to the bonding film 3. Since such a method can efficiently apply the energy to the bonding film 3 relatively easily, the method is suitably used as the method of applying the energy.

Examples of the energy beam include: a ray such as an ultraviolet ray or a laser beam; an electromagnetic wave such as a X ray or a y ray; a particle beam such as an electron beam or an ion beam; and combinations of two or more kinds of these energy beams.

Figure 1E:
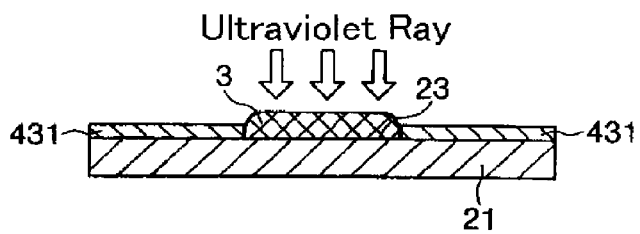

Among these energy beams, it is particularly preferred that an ultraviolet ray having a wavelength of about 126 to 300 nm is used (see FIG. 1E). Use of the ultraviolet ray having such a wavelength makes it possible to optimize an amount of the energy to be applied to the bonding film 3.

As a result, it is possible to prevent excessive breakage of the molecular bonds of the silicone compounds constituting a main portion (a trunk portion) of the bonding film 3, and to selectively break the molecular bonds of the silicone compounds present in the vicinity of the surface of the bonding film 3. This makes it possible for the bonding film 3 to develop the bonding property, while preventing a property thereof such as a mechanical property or a chemical property from being lowered.

Further, the use of the ultraviolet ray makes it possible to process a wide area of the surface of the bonding film 3 without unevenness in a short period of time. Therefore, the breakage of the molecular bonds of the silicone compounds present in the vicinity of the surface of the bonding film 3 can be efficiently performed. Moreover, such an ultraviolet ray has, for example, an advantage that it can be generated by simple equipment such as an UV lamp.

In this regard, it is to be noted that the wavelength of the ultraviolet ray is more preferably in the range of about 126 to 200 nm.

In the case where the UV lamp is used, power of the UV lamp is preferably in the range about of 1 mW/cm$^2$ to 1 W/cm$^2$, and more preferably in the range of about 5 to 50 mW/cm$^2$, although being different depending on an area of the surface of the bonding film 3. In this case, a distance between the UV lamp and the bonding film 3 is preferably in the range of about 3 to 3,000 mm, and more preferably in the range of about 10 to 1,000 mm.

Further, a time for irradiating the ultraviolet ray is preferably set to a time enough for selectively breaking the molecular bonds of the silicone compounds present in the vicinity of the surface of the bonding film 3.

Specifically, the time is preferably in the range of about 1 second to 30 minutes, and more preferably in the range of about 1 second to 10 minutes, although being slightly different depending on an amount of the ultraviolet ray, the constituent material of the bonding film 3, and the like.

The ultraviolet ray may be irradiated temporally continuously or intermittently (in a pulse-like manner).

On the other hand, examples of the laser beam include: a pulse oscillation laser (a pulse laser) such as an excimer laser; a continuous oscillation laser such as a carbon dioxide laser or a semiconductor laser; and the like. Among these lasers, it is preferred that the pulse laser is used.

Use of the pulse laser makes it difficult to accumulate of heat in a portion of the bonding film 3 where the laser beam is irradiated with time. Therefore, it is possible to reliably prevent alteration and deterioration of the bonding film 3 due to the heat accumulated. Namely, according to the use of the pulse laser, it is possible to prevent affection of the heat accumulated inside the bonding film 3.

In the case where influence of the heat is taken into account, it is preferred that a pulse width of the pulse laser is as small as possible. Specifically, the pulse width is preferably equal to or smaller than 1 ps (picosecond), and more preferably equal to or smaller than 500 fs (femtoseconds).

By setting the pulse width to the above range, it is possible to reliably suppress the influence of the heat generated in the bonding film 3 due to the irradiation with the laser beam. In this regard, it is to be noted that the pulse laser having the small pulse width of the above range is called "femtosecond laser".

A wavelength of the laser beam is not particularly limited to a specific value, but is preferably in the range of about 200 to 1,200 nm, and more preferably in the range of about 400 to 1,000 nm. Further, in the case of the pulse laser, peak power of the laser beam is preferably in the range of about 0.1 to 10 W, and more preferably in the range of about 1 to 5 W, although being different depending on the pulse width thereof.

Moreover, a repetitive frequency of the pulse laser is preferably in the range of about 0.1 to 100 kHz, and more preferably in the range of about 1 to 10 kHz. By setting the frequency of the pulse laser to the above range, the molecular bonds of the silicone compounds present in the vicinity of the surface of the bonding film 3 can be selectively broken.

By appropriately setting various conditions for such a laser beam, the temperature in the portion where the laser beam is irradiated is adjusted so as to be preferably in the range of about normal temperature (room temperature) to 600° C., more preferably about in the range of 200 to 600° C., and even more preferably in the range of about 300 to 400° C. The adjustment of the temperature in the region to the above range makes it possible to selectively break the molecular bonds of the silicone compounds present in the vicinity of the surface of the bonding film 3.

The laser beam irradiated on the bonding film 3 is preferably scanned along the surface of the bonding film 3 with a focus thereof set on the surface. By doing so, heat generated by the irradiation of the laser beam is locally accumulated in the vicinity of the surface. As a result, it is possible to selectively break the molecular bonds of the silicone compounds present in the vicinity of the surface of the bonding film 3.

Further, the irradiation of the energy beam on the bonding film 3 may be performed in any ambient atmosphere. Specifically, examples of the ambient atmosphere include: an oxidizing gas atmosphere such as air or an oxygen gas; a reducing gas atmosphere such as a hydrogen gas; an inert gas atmosphere such as a nitrogen gas or an argon gas; a decompressed (vacuum) atmospheres obtained by decompressing any one of these ambient atmospheres; and the like.

Among these ambient atmospheres, the irradiation is particularly preferably performed in the air atmosphere (particularly, an atmosphere having a low dew point). By doing so, it is possible to generate an ozone gas near the surface. This makes it possible to more smoothly activate the surface. Further, by doing so, it becomes unnecessary to spend a labor hour and a cost for controlling the ambient atmosphere. This makes it possible to easily perform (carry out) the irradiation of the energy beam.

In this way, according to the method of irradiating the energy beam, the energy can be easily applied to the bonding film 3 selectively. Therefore, it is possible to prevent, for example, alteration and deterioration of the first base member 21 due to the application of the energy.

Further, according to the method of irradiating the energy beam, magnitude of the energy to be applied can be accurately and easily controlled. Therefore, it is possible to adjust the number of the molecular bonds to be broken within the bonding film 3. By adjusting the number of the molecular bonds to be broken in this way, it is possible to easily control the bonding strength between the first base member 21 and the second base member 22.

In other words, by increasing the number of the molecular bonds to be broken in the vicinity of the surface of the bonding film 3, since a large number of active hands are generated in the vicinity of the surface, it is possible to further improve the bonding property developed in the bonding film 3.

On the other hand, by reducing the number of the molecular bonds to be broken in the vicinity of the surface of the bonding film 3, it is possible to reduce the number of the active hands generated in the vicinity of the surface, thereby suppressing the bonding property developed in the bonding film 3.

In order to adjust the magnitude of the applied energy, for example, conditions such as a kind of the energy beam, power of the energy beam, and an irradiation time of the energy beam only have to be controlled.

Further, according to the method of irradiating the energy beam, a large amount of the energy can be applied to the bonding film 3 for a short period of time. This makes it possible to more effectively perform the application of the energy.

Figure 2F:
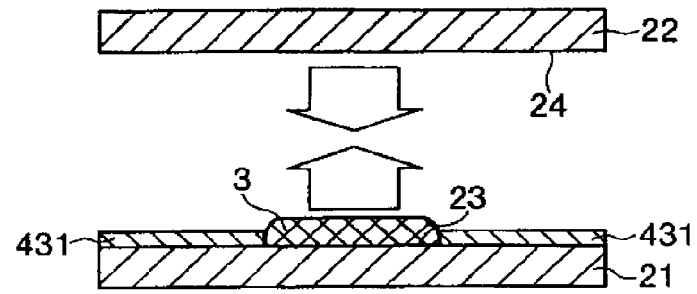

[6] Next, the first base member 21 and the second base member 22 are laminated together so that the bonding film 3 and the bonding surface 24 of the second base member 22 make close contact with each other (see FIG. 2F). At this time, since the surface of the bonding film 3 has developed the bonding property with respect to the second base member 22 in the step [5], the bonding film 3 and the second base member 22 (the bonding surface 24) are chemically bonded together.

Figure 2G:
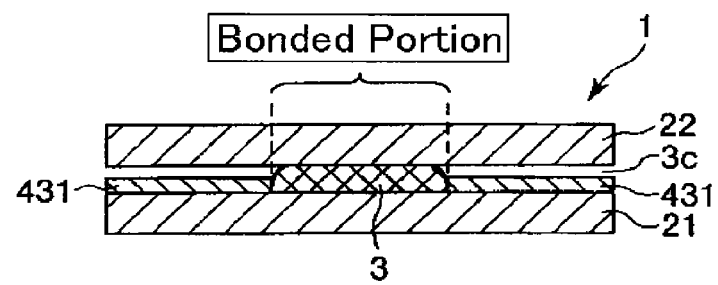

As a result, the first base member 21 and the second base member 22 are partially bonded together through the bonding film 3 to thereby obtain a bonded body 1 shown in FIG. 2G. Namely, in the bonded body 1, the first base member 21 and the second base member 22 are partially bonded together in a region where they make contact with the bonding film 3.

In the bonded body 1 obtained in this way, the two base members 21 and 22 are bonded together by firm chemical bonds formed in a short period of time such as a covalent bond, unlike bond (adhesion) mainly based on a physical bond such as an anchor effect by using the conventional adhesive. Therefore, it is possible to obtain a bonded body 1 in a short period of time, and to prevent occurrence of peeling, bonding unevenness and the like in the bonded body 1.

Further, according to such a method of manufacturing the bonded body 1, a heat treatment at a high temperature (e.g., a temperature equal to or higher than 700° C.) is unnecessary unlike the conventional solid bonding method. Therefore, the first base member 21 and the second base member 22 each formed of a material having low heat resistance can also be used for bonding them.

In addition, the first base member 21 and the second base member 22 are bonded together through the bonding film 3. Therefore, there is also an advantage that each of the constituent materials of the base members 21 and 22 is not limited to a specific kind. For these reasons, it is possible to expand selections of the constituent materials of the first base member 21 and the second base member 22.

Further, a thermal expansion coefficient of the bonding film 3 is much lower than that of the conventional adhesive. Therefore, even if an ambient temperature is changed, the thickness of the bonding film 3 hardly changes. As a result, the dimensional accuracy thereof becomes very high.

Furthermore, in this embodiment, the bonding film 3 is selectively formed on a region of the bonding surface 23 of the first base member 21 to which the second base member 22 is to be bonded. Therefore, in the case where the first base member 21 and the second base member 22 have different thermal expansion coefficients with each other, stress which would be generated on a bonding interface therebetween in the bonded body 1 is suppressed to a low level compared with a bonded body in which the bonding film 3 is formed on the entire of the surface 23. This makes it possible to reliably prevent or suppress peeling of the first base member 21 from the second base member 22.

In addition, in the case where the first base member and the second base member 22 have the different thermal expansion coefficients with each other, it is preferred that the first base member 21 and the second base member 22 are bonded together at as low temperature as possible. If they are bonded together at the low temperature, it is possible to further reduce the thermal stress which would be generated on the bonding interface therebetween.

Specifically, the first base member 21 and the second base member 22 are bonded together in a state that each of the first base member 21 and the second base member 22 is heated preferably at a temperature of about 25 to 50° C., and more preferably at a temperature of about 25 to 40° C., although being different depending on the difference between the thermal expansion coefficients thereof.

In such a temperature range, even if the difference between the thermal expansion coefficients of the first base member 21 and the second base member 22 is rather large, it is possible to sufficiently reduce thermal stress which would be generated on the bonding interface between the first base member 21 and the second base member 22. As a result, it is possible to reliably suppress or prevent occurrence of warp, peeling or the like in the bonded body 1.

Especially, in the case where the difference between the thermal expansion coefficients of the first base member 21 and the second base member 22 is equal to or larger than $5 \times 10^{-5}$/K, it is particularly recommended that the first base member 21 and the second base member 22 are bonded together at a low temperature as much as possible as described above.

According to this embodiment, when the first base member 21 and the second base member 22 are not bonded together in the entire of the bonding interface therebetween, but partially bonded together through the bonding film 3 selectively formed on the bonding film formation region 41. Further, a shape and a size of the bonding film 3 can be adjusted by merely controlling those of the bonding film formation region 41.

Therefore, by controlling the shape and the size of the bonding film 3 through which the first base member 21 and the second base member 22 are bonded together, it is possible to easily adjust the bonding strength therebetween. As a result, there is provided a bonded body 1 which can be easily separated into the first base member 21 and the second base member 22.

Namely, by controlling the shape and the size of the bonding film 3 (the bonding film formation region 41), it is possible to adjust not only the bonding strength between the first base member 21 and the second base member 22 but also separating strength (splitting strength) therebetween.

From this standpoint, it is preferred that, in the case of producing an easy-to-separate bonded body 1, the bonding strength between the first base member 21 and the second base member 22 is set enough for the human hands to separate the bonded body 1. By doing so, it becomes possible to easily separate the bonded body 1 without having to use any device or tool.

By appropriately setting the shape and the size of the bonding film 3 through which the first base member 21 and the second base member 22 are bonded together, it is possible to reduce local concentration of stress which would be generated in the bonding film 3. This makes it possible to reliably bond the first base member 21 and the second base member 22 together, even if the difference between, for example, the thermal expansion coefficients thereof is large.

In addition, according to the method of this embodiment, as shown in FIG. 2G, between the first base member and the second base member 22 in a region on which the bonding film 3 is not formed, a gap 3c having a distance (a size) corresponding to the thickness of the bonding film 3 is formed. This means that it is possible to easily form closed spaces, flow paths or the like each having a desired shape between the first base member 21 and the second base member 22 by suitably controlling the shape of the bonding film 3, in order to effectively utilize the gap 3c.

Here, description will be made on a mechanism that the first base member 21 and the second base member 22 are bonded together in this process. Hereinafter, description will be representatively offered regarding a case that the hydroxyl groups are exposed in the surface 24 of the second base member 22.

In this process, when the first base member 21 and the second base member 22 are laminated together so that the bonding film 3 formed on the first base member 21 makes contact with the bonding surface 24 of the second base member 22, the hydroxyl groups existing on the surface of the bonding film 3 and the hydroxyl groups existing on the bonding surface 24 of the second base member 22 are attracted together, as a result of which hydrogen bonds are generated between the above adjacent hydroxyl groups. It is conceived that the generation of the hydrogen bonds makes it possible to bond the first base member 21 and the second base member 22 together.

Depending on conditions such as a temperature and the like, the hydroxyl groups bonded together through the hydrogen bonds are dehydrated and condensed, so that the hydroxyl groups and/or water molecules are removed from a bonding interface between the bonding film 3 and the second base member 22. As a result, two atoms, to which the hydroxyl group had been bonded, are bonded together directly or via an oxygen atom. In this way, it is conceived that the first base member 21 and the second base member 22 are firmly bonded together.

In addition, in the case where the dangling bonds (the uncoupled bonds) exist on the surface of the bonding film 3 and/or in the bonding film 3 or on the surface 24 of the second base member 22 and/or in the second base member 22, when the first base member 21 and the second base member 22 are laminated together, the dangling bonds are bonded together.

This bonding occurs in a complicated fashion so that the dangling bonds are inter-linked. As a result, network-like bonds are formed in the bonding interface. This makes it possible to particularly firmly bond the bonding film 3 and the second base member 22 together.

In this regard, an activated state that the surface of the bonding film 3 is activated in the step [5] is reduced with time. Therefore, it is preferred that this step [6] is started as early as possible after the step [5]. Specifically, this step [6] is preferably started within 60 minutes, and more preferably started within 5 minutes after the step [5].

If the step [6] is started within such a time, since the surface of the bonding film 3 maintains a sufficient activated state, when the first base member 21 is bonded to the second base member 22 through the bonding film 3, they can be bonded together with sufficient high bonding strength therebetween.

In other words, the bonding film 3 before being activated is a film containing the silicone material as the major component thereof, and therefore it has relatively high chemical stability and excellent weather resistance. For this reason, the bonding film 3 before being activated can be stably stored for a long period of time. Therefore, a first base member 21 having such a bonding film 3 may be used as follows.

Namely, first, a large number of the first base members 21 each having such a bonding film 3 have been manufactured or purchased, and stored in advance. Then just before each of the first base members 21 is laminated to the second base member 22 through the bonding film 3 in this step, the energy is applied to only a necessary number of the first base members 21 each having such a bonding film 3 as described in the step [5]. This use is preferable because the bonded bodies 1 are manufactured effectively.

Through the above steps, it is possible to obtain a bonded body 1 (the bonded body of the present invention) shown in FIG. 2G.

In the bonded body 1 obtained in this way, the bonding strength between the first base member 21 and the second base member 22 is preferably equal to or larger than 5 MPa (50 kgf/cm$^2$), and more preferably equal to or larger than 10 MPa (100 kgf/cm$^2$). Therefore, peeling of the bonded body 1 having such bonding strength can be sufficiently prevented.

Further, use of the method of the present invention makes it possible to efficiently manufacture the bonded body 1 in which the first base member 21 and the second base member 22 are bonded together through the bonding film 3 with the above large bonding strength.

Just when the bonded body 1 is obtained or after the bonded body 1 has been obtained, if necessary, at least one step (step of improving bonding strength between the first base member 21 and the second base member 22) of two steps [7A] and [7B] which will be described below may be applied to the bonded body 1.

This makes it possible to further improve the bonding strength between the first base member 21 and the second base member 22 (including the bonding strength between the first base member 21 and the bonding film 3 and the bonding strength between the second base member 22 and the bonding film 3) with ease.

Figure 2H:
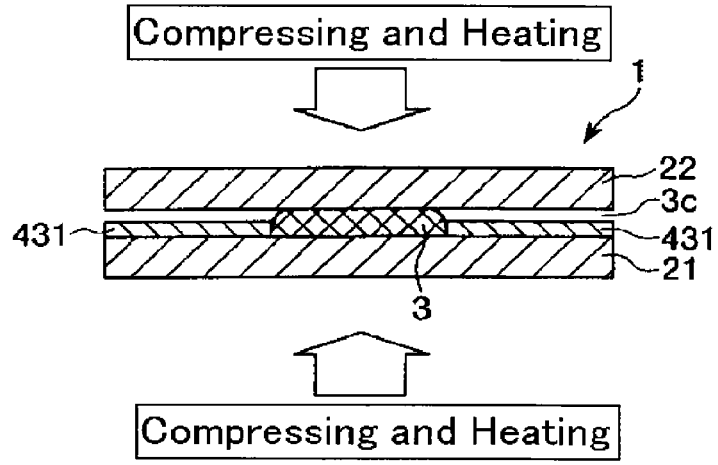

[7A] As shown in FIG. 2H, the obtained bonded body 1 is compressed in a direction in which the first base member 21 and the second base member 22 come close to each other.

As a result, surfaces of the bonding film 3 come closer to the bonding surface 23 of the first base member 21 and the bonding surface 24 of the second base member 22, respectively. It is possible to further improve the bonding strength between the first base member 21 and the second base member 22 in the bonded body 1.

Further, by compressing the bonded body 1, spaces remaining in each of the boding interfaces in the bonded body 1 can be crashed to further increase bonding areas thereof. This makes it possible to further improve the bonding strength between the first base member 21 and the second base member 22 in the bonded body 1.

In this regard, it is to be noted that a pressure in compressing the bonded body 1 can be appropriately adjusted, depending on the constituent materials and thicknesses of the first base member 21 and the second base member 22, conditions of a bonding apparatus, and the like.

Specifically, the pressure is preferably in the range of about 0.2 to 10 MPa, and more preferably in the range of about 1 to 5 MPa, although being slightly different depending on the constituent materials and thicknesses of the first base member 21 and the second base member 22, and the like.

By setting the pressure to the above range, it is possible to reliably improve the bonding strength between the first base member 21 and the second base member 22 in the bonded body 1. Further, although the pressure may exceed the above upper limit value, there is a fear that damages and the like occur in the first base member 21 and the second base member 22, depending on the constituent materials thereof.

A time for compressing the bonded body 1 is not particularly limited to a specific value, but is preferably in the range of about 10 seconds to 30 minutes. The compressing time can be appropriately changed, depending on the pressure in compressing the bonded body 1.

Specifically, in the case where the pressure in compressing the bonded body 1 is higher, it is possible to improve the bonding strength between the first base member 21 and the second base member 22 in the bonded body 1 even if the compressing time becomes short.

[7B] As shown in FIG. 2H, the obtained bonded body 1 is heated.

This makes it possible to further improve the bonding strength between the first base member 21 and the second base member 22 in the bonded body 1. A temperature in heating the bonded body 1 is not particularly limited to a specific value, as long as the temperature is higher than room temperature and lower than a heat resistant temperature of the bonded body 1.

Specifically, the temperature is preferably in the range of about 25 to 100° C., and more preferably in the range of about 50 to 100° C. If the bonded body 1 is heated at the temperature of the above range, it is possible to reliably improve the bonding strength between the first base member 21 and the second base member 22 in the bonded body 1 while reliably preventing them from being thermally altered and deteriorated.

Further, a heating time is not particularly limited to a specific value, but is preferably in the range of about 1 to 30 minutes.

In the case where both steps [7A] and [7B] are performed, the steps are preferably performed simultaneously. In other words, as shown in FIG. 2H, the bonded body 1 is preferably heated while being compressed. By doing so, an effect by compressing and an effect by heating are exhibited synergistically. It is possible to particularly improve the bonding strength between the first base member 21 and the second base member 22 in the bonded body 1.

Through the steps described above, it is possible to easily improve the bonding strength between the first base member 21 and the second base member 22 in the bonded body 1.

Second Embodiment

Next, description will be made on a second embodiment of the method of manufacturing the bonded body according to the present invention.

FIGS. 3A to 3E, 4F and 4G are sectional views for explaining the second embodiment of the method of manufacturing the bonded body according to the present invention. In this regard, it is to be noted that in the following description, an upper side in each of FIGS. 3A to 3E, 4F and 4G will be referred to as "upper" and a lower side thereof will be referred to as "lower".

Hereinafter, the second embodiment of the method of manufacturing the bonded body will be described by placing emphasis on the points differing from the first embodiment of the method of manufacturing the bonded body, with the same matters omitted from description.

The method according to this embodiment is the same as the method according to the first embodiment, except that the bonding films 3a and 3b are, respectively, formed on both the first base member 21 and the second base member 22, and the first base member 21 and the second base member 22 are bonded together through the bonding films 3a and 3b to thereby obtain a bonded body 1.

Namely, the method according to this embodiment comprises: preparing a first base member 21 having a first bonding film formation region 41a and a second base member 22 having a second bonding film formation region 41b; imparting the liquid repellency for the liquid material 30 to a region other than the first bonding film formation region 41a of the first base member 21 and a region other than the second bonding film formation region 41b of the second base member 22, respectively, to form a first liquid repellent region 43a and a second liquid repellent region 43b thereon; supplying the liquid material 30 onto the first base member 21 and the second base member 22, respectively, to form liquid coatings 31a and 31b on the respective bonding film formation regions 41a and 41b; drying the respective liquid coatings 31a and 31b to obtain the respective bonding films 3a and 3b on the respective bonding film formation regions 41a and 41b; applying energy to the respective bonding films 3a and 3b to develop a bonding property in a vicinity of each of surfaces thereof; and laminating the first base member 21 and the second base member 22 together so that the bonding film 3a and the bonding film 3b make close contact with each other to thereby obtain a bonded body 1 in which the base members 21 and 22 are partially bonded together through the bonding films 3a and 3b.

Hereinafter, the method of manufacturing the bonded body according to this embodiment will be described one after another.

[1] First, the first base member 21 and the second base member 22 are prepared in the same manner as in the first embodiment.

Figure 3A:
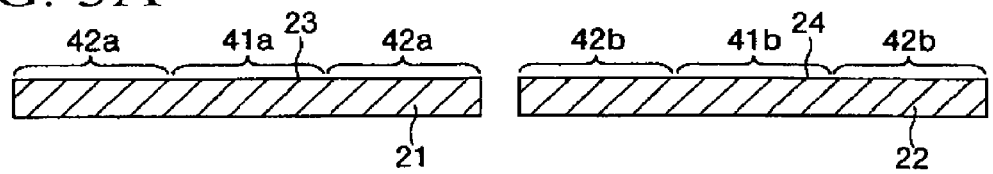
FIGS. 3A to 3E, 4F and 4G are sectional views for explaining a second embodiment of the method of manufacturing the bonded body according to the present invention.

In this regard, in this embodiment, as shown in FIG. 3A, a region other than an outer circumference portion of one surface (the bonding surface 23) of the first base member 21 is defined as the first bonding film formation region 41a on which the bonding film 3a is to be formed, whereas a region other than an outer circumference portion of one surface (the bonding surface 24) of the second base member 22 is defined as the second bonding film formation region 41b on which the bonding film 3b is to be formed.

Figure 3B:
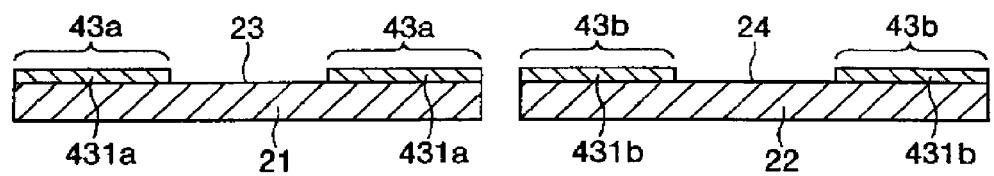

[2] Next, as shown in FIG. 3B, the liquid repellency is imparted to (a liquid repellent film 431a is formed on) a region (hereinafter, referred to as "first bonding film non-formation region 42a") other than the bonding film formation region 41a of the bonding surface 23 of the first base member 21 to thereby form the first liquid repellent region 43a thereon.

Likewise, the liquid repellency is imparted to (a liquid repellent film 431b is formed on) a region (hereinafter, referred to as "second bonding film non-formation region 42b") other than the bonding film formation region 41b of the bonding surface 24 of the second base member 22 to thereby form the second liquid repellent region 43b thereon.

In this regard, it is to be noted that a method of imparting the liquid repellency to the first bonding film non-formation region 42a of the first base member 21 may be the same as or different from a method of imparting the liquid repellency is imparted to the second bonding film non-formation region 42b of the second base member 22.

Figure 3C:
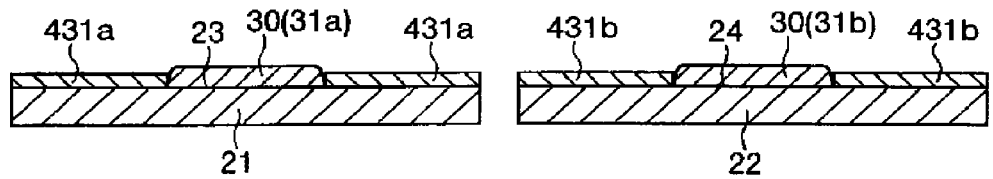

[3] Next, as shown in FIG. 3C, the liquid material 30 containing the silicone material composed of the silicone compounds is supplied onto the first bonding film formation region 41a of the first base member 21 to obtain the liquid coating 31a. Likewise, the liquid material 30 containing the silicone material composed of the silicone compounds is supplied onto the second bonding film formation region 41b of the second base member 22 to obtain the liquid coating 31b.

In this case, a composition, a polymerization degree of the silicone compounds or the like of the silicone material contained in the liquid material 30 to be supplied onto the first bonding film formation region 41a may be different from that of the silicone material contained in the liquid material 30 to be supplied onto the second bonding film formation region 41b, but it is preferred that they are the same.

This makes it possible to improve affinity between the bonding film 3a and the bonding film 3b. As a result, through the steps which will be described below, the bonding film 3a and the bonding film 3b can be firmly bonded together.

[4] Next, the liquid material 30 (the liquid coating 31a) supplied onto the first bonding film formation region 41a of the first base member 21 is dried. Likewise, the liquid material 30 (the liquid coating 31b) supplied onto the second bonding film formation region 41b of the second base member 22 is dried.

Figure 3D:
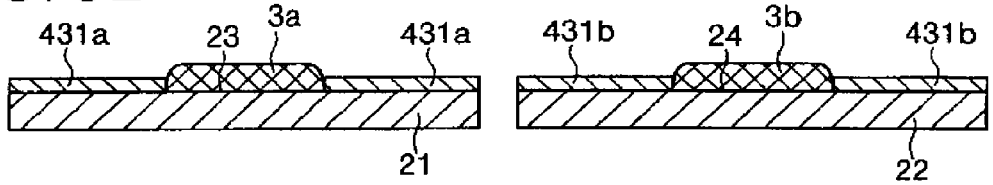

In this way, as shown in FIG. 3D, the bonding film 3a patterned so as to correspond to a shape (a predetermined shape) of the first bonding film formation region 41a is formed. Further, the bonding film 3b patterned so as to correspond to a shape (a predetermined shape) of the second bonding film formation region 41b is formed.

Figure 3E:
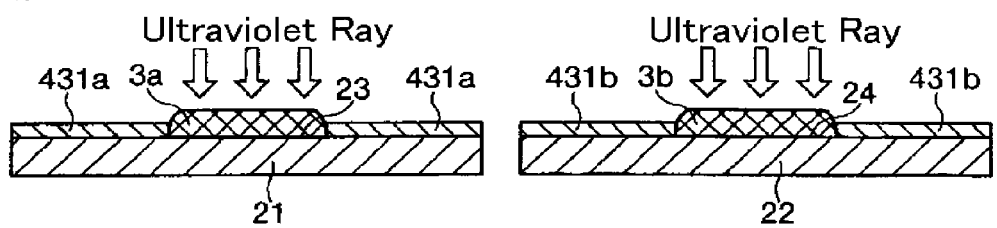

[5] Next, as shown in FIG. 3E, the energy is applied to the bonding film 3a formed on the first base member 21.

Likewise, the energy is applied to the bonding film 3b formed on the second base member 22.

When the energy is applied to the respective bonding films 3a and 3b, a part of molecular bonds of the silicone compounds present in the vicinity of each of the surfaces of the bonding films 3a and 3b are broken. As a result, the surfaces are activated due to breakage of the molecular bonds. Namely, the bonding property is developed in the vicinity of each of the surfaces of the bonding films 3a and 3b.

Figure 4F:
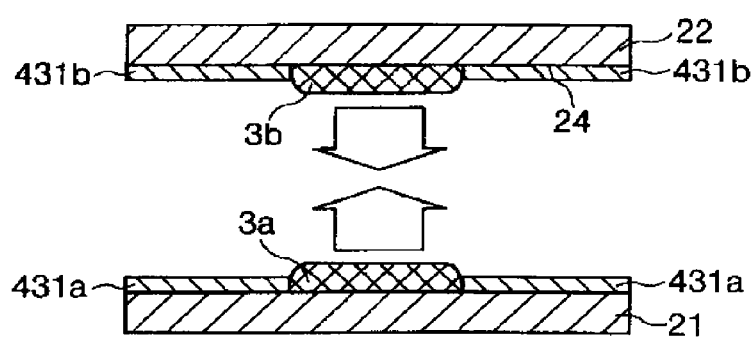
Figure 4G:
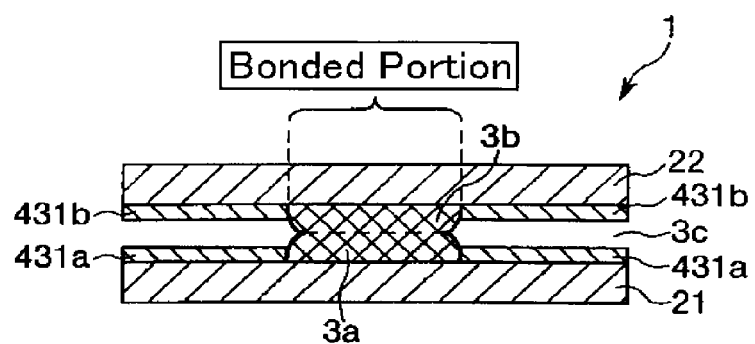

[6] Next, the first base member 21 and the second base member 22 are laminated together so that the bonding film 3a and the bonding film 3b make close contact with each other (see FIG. 4F). At this time, since each of the surfaces of the bonding films 3a and 3b has developed the bonding property in the step [5], the bonding film 3a and the bonding film 3b are chemically bonded together in a region where they (the first bonding film formation region 41a and the second bonding film formation region 41b) overlap with each other to thereby obtain a bonded body 1 shown in FIG. 4G.

Namely, in the bonded body 1, the first base member 21 and the second base member 22 are partially bonded together through the bonding film 3a formed on the first bonding film formation region 41a and the bonding film 3b formed on the second bonding film formation region 41b.

After the bonded body 1 has been obtained, if necessary, at least one step of the two steps [7A] and [7B] described above may be applied to the bonded body 1. This makes it possible to further improve bonding strength between the first base member 21 and the second base member 22 (including bonding strength between the first base member 21 and the bonding film 3a, bonding strength between the second base member and the bonding film 3b and bonding strength between the bonding films 3a and 3b) with ease.

According to this embodiment, the same operations and effects as described in the first embodiment can be obtained.

Further, since the bonding films 3a and 3b are bonded together in this embodiment, the two base members 21 and 22 can be more firmly bonded together compared with the first embodiment.

Although a pattern (a shape) of the bonding film 3a formed on the first base member 21 is the same as that of the bonding film 3b formed on the second base member 22 in this embodiment, the bonding films 3a and 3b may have different patterns with each other.

Third Embodiment

Next, description will be made on a third embodiment of the method of manufacturing the bonded body according to the present invention.

Figure 5A:
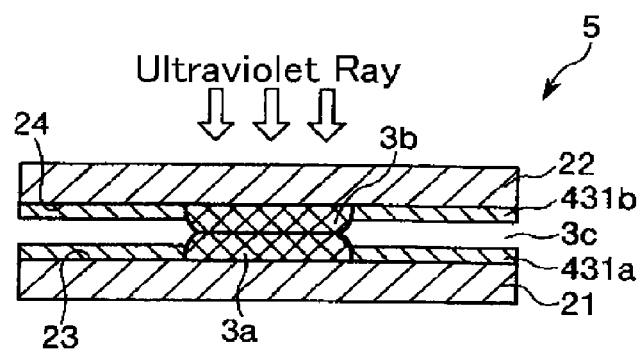
FIGS. 5A and 5B are sectional views for explaining a third embodiment of the method of manufacturing the bonded body according to the present invention.
Figure 5B:
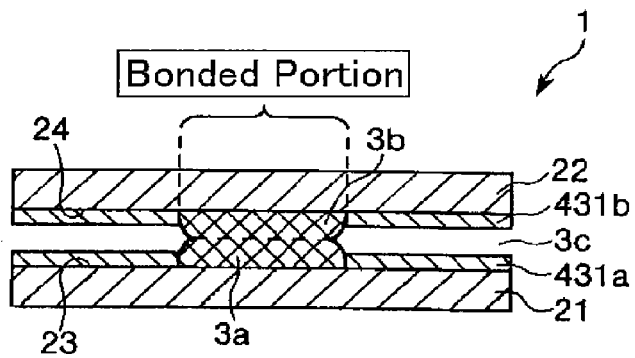

FIGS. 5A and 5B are sectional views for explaining the third embodiment of the method of manufacturing the bonded body according to the present invention. In this regard, it is to be noted that in the following description, an upper side in each of FIGS. 5A and 5B will be referred to as "upper" and a lower side thereof will be referred to as "lower".

Hereinafter, the third embodiment of the method of manufacturing the bonded body will be described by placing emphasis on the points differing from the first and second embodiments of the method of manufacturing the bonded body, with the same matters omitted from description.

The method according to this embodiment is the same as the method according to the second embodiment, except that the first base member 21 and the second base member 22 are laminated together through the bonding films 3a and 3b before the energy is applied thereto to obtain a provisional bonded body 5, and then the energy is applied to the provisional bonded body 5 to thereby obtain a bonded body 1.

Namely, the method according to this embodiment comprises: preparing the first base member 21 having the first bonding film formation region 41a and the second base member 22 having the second bonding film formation region 41b; imparting the liquid repellency for the liquid material 30 to the region other than the bonding film formation region 41a of the first base member 21 and the region other than the bonding film formation region 41b of the second base member 22, respectively, to form the first liquid repellent region 43a and the second liquid repellent region 43b thereon; supplying the liquid material 30 onto the first base member 21 and the second base member 22, respectively, to form liquid coatings 31a and 31b on the respective bonding film formation regions 41a and 41b; drying the respective liquid coatings 31a and 31b to obtain the respective bonding films 3a and 3b on the respective bonding film formation regions 41a and 41b; laminating the first base member 21 and the second base member 22 together so that the bonding film 3a and the bonding film 3b make close contact with each other to obtain the provisional bonded body 5; and applying energy to the respective bonding films 3a and 3b included in the provisional bonded body 5 to thereby obtain a bonded body 1 in which the base members 21 and 22 are partially bonded together through the bonding films 3a and 3b.

Hereinafter, the method of manufacturing the bonded body according to this embodiment will be described one after another.

[1] to [4] First, the bonding film 3a is formed on the first base member 21 and the bonding film 3b is also formed on the second base member 22 in the same manner as in the steps [1] to [4] described in the second embodiment.

[5] Next, as shown in FIG. 5A, the first base member 21 and the second base member 22 are laminated together so that the bonding film 3a and the bonding film 3b make close contact with each other. In this way, the provisional bonded body 5 can be obtained. In this state, the bonding film 3*a* and the bonding film 3*a* are not bonded together in the provisional bonded body 5.

Therefore, since the first base member 21 can be slid with respect to the second base member 22, it is possible to finely adjust a relative position therebetween with ease. As a result, dimensional accuracy of the finally obtained bonded body 1 can be further improved.

[6] Next, the energy is applied to the bonding films 3*a* and 3*b* included in the provisional bonded body 5. Specifically, as shown in FIG. 5B, application of the energy to the bonding films 3*a* and 3*b* is performed by irradiating an ultraviolet ray on the provisional bonded body 5.

When the ultraviolet ray is irradiated on the bonding films 3*a* and 3*b* included in the provisional bonded body 5, a part of the molecular bonds of the silicone compounds present in the vicinity of each of the surfaces of the bonding films 3*a* and 3*b* are broken. As a result, the surfaces are activated due to breakage of the molecular bonds. Namely, the bonding property is developed in the vicinity of each of the surfaces of the bonding films 3*a* and 3*b*.

Due to the bonding property, the bonding film 3*a* and the bonding film 3*b* are chemically bonded together in the region where they (the first bonding film formation region 41*a* and the second bonding film formation region 41*b*) overlap with each other to thereby obtain a bonded body 1 shown in FIG. 5B. Namely, in the bonded body 1, the first base member 21 and the second base member 22 are partially bonded together through the bonding film 3*a* formed on the first bonding film formation region 41*a* and the bonding film 3*b* formed on the second bonding film formation region 41*b*.

The application method of the energy is not limited to the method in which the ultraviolet ray is irradiated on the provisional bonded body 5, but the same method as described in the first embodiment may be used as the application method of the energy.

Hereinafter, description will be made on a method in which the bonding films 3*a* and 3*b* included in the provisional bonded body 5 are heated and a method in which a compressing force is imparted to the bonding films 3*a* and 3*b*.

In the case where the bonding films 3*a* and 3*b* are heated, a heating temperature is preferably set to a range of about 25 to 100° C., and is more preferably set to a range of about 50 to 100° C. By heating the bonding films 3*a* and 3*b* at the temperature within the above range, the bonding films 3*a* and 3*b* can be reliably activated while reliably preventing thermal alteration and deterioration thereof.

Further, a heating time is set great enough to break the molecular bonds of the silicone compounds present in the vicinity of each of the surfaces of the bonding films 3*a* and 3*b*. Specifically, the heating time may be preferably in the range of about 1 to 30 minutes if the heating temperature is set to the above mentioned range.

Furthermore, the bonding films 3*a* and 3*b* may be heated by any heating method. Examples of the heating method include various kinds of methods such as a method of using a heater, a method of irradiating an infrared ray and a method of making contact with a flame.

On the other hand, in the case where the energy is applied to the bonding films 3*a* and 3*b* by imparting the compressive force to the bonding films 3*a* and 3*b*, it is preferred that the provisional bonded body 5 is compressed in a direction that the first base member 21 and the second base member 22 come close to each other. Specifically, a pressure in compressing the provisional bonded body 5 is preferably in the range of about 0.2 to 10 MPa, and more preferably in the range of about 1 to 5 MPa.

This makes it possible to easily apply appropriate energy to the bonding films 3*a* and 3*b* by merely performing a compressing operation, which ensures that a sufficiently high bonding property is developed in each of the bonding films 3*a* and 3*b*. Although the pressure may exceed the above upper limit value, it is likely that damages and the like occur in the first base member 21 and the second base member 22, depending on the constituent materials thereof.

Further, a compressing time is not particularly limited to a specific value, but is preferably in the range of about 10 seconds to 30 minutes. In this regard, it is to be noted that the compressing time can be suitably changed, depending on magnitude of the compressive force. Specifically, the compressing time can be shortened as the compressive force becomes greater.

After the bonded body 1 has been obtained, if necessary, at least one step of the two steps [7A] and [7B] described above may be applied to the bonded body 1. This makes it possible to further improve the bonding strength between the first base member 21 and the second base member 22 (including the bonding strength between the first base member 21 and the bonding film 3*a*, the bonding strength between the second base member 22 and the bonding film 3*b* and the bonding strength between the bonding films 3*a* and 3*b*) with ease.

According to this embodiment, the same operations and effects as described in the first and second embodiments can be obtained.

The method of manufacturing the bonded body according to the present invention described above can be used in bonding different kinds of members together.

Examples of an article (a bonded body) to be manufactured by such a method of manufacturing the bonded body include: semiconductor devices such as a transistor, a diode and a memory; piezoelectric devices such as a crystal oscillator; optical devices such as a reflecting mirror, an optical lens, a diffraction grating and an optical filter; photoelectric conversion devices such as a solar cell; semiconductor substrates having semiconductor devices mounted thereon; insulating substrates having wirings or electrodes formed thereon; ink-jet type recording heads; parts of micro electromechanical systems such as a micro reactor and a micro mirror; sensor parts such as a pressure sensor and an acceleration sensor; package parts of semiconductor devices or electronic components; recording media such as a magnetic recording medium, a magneto-optical recording medium and an optical recording medium; parts for display devices such as a liquid crystal display device, an organic EL device and an electrophoretic display device; parts for fuel cells; and the like.

Liquid Droplet Ejection Head

Hereinafter, description will be made on an embodiment of a liquid droplet ejection head in which the bonded body according to the present invention is used.

Figure 6:
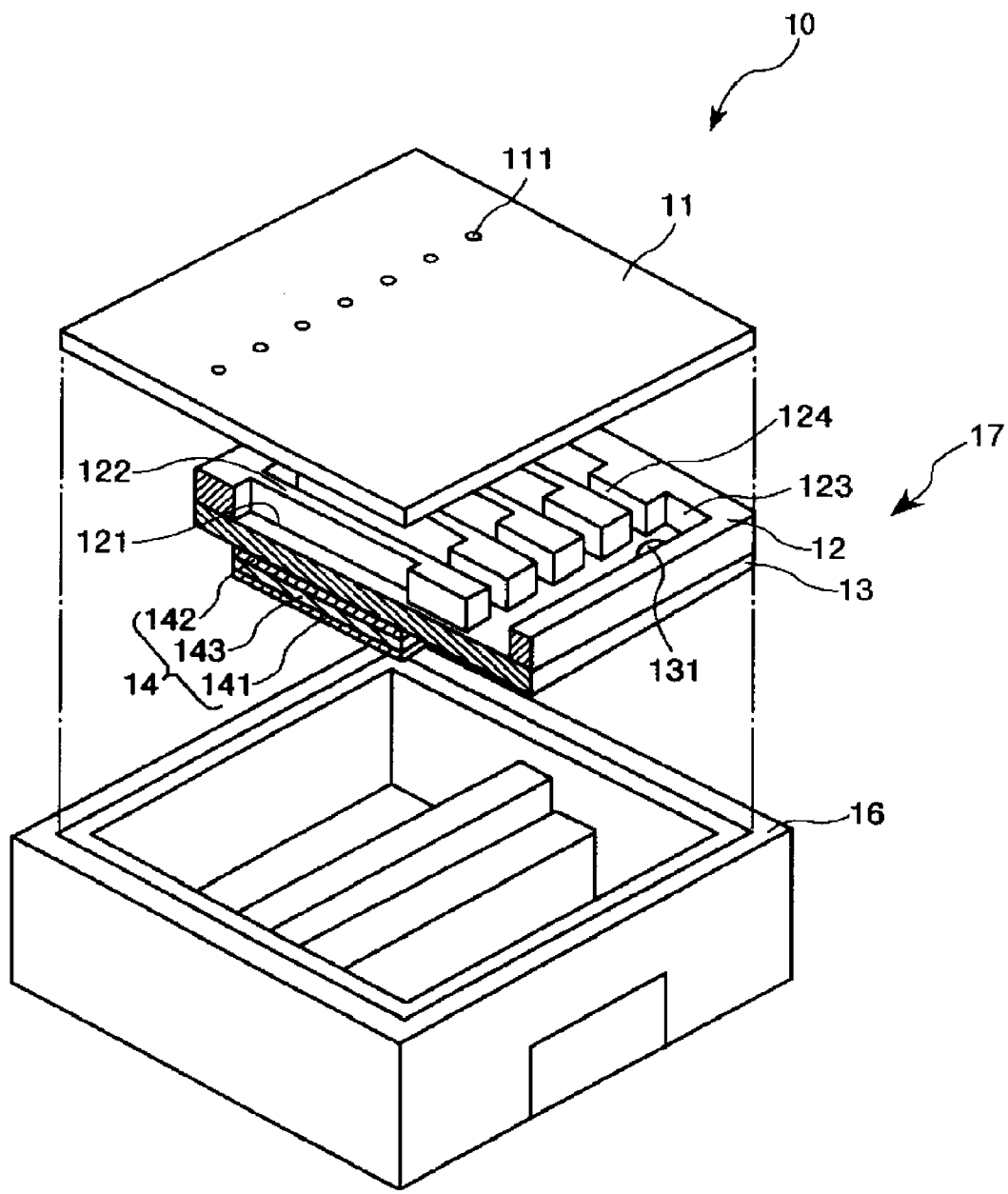
FIG. 6 is an exploded perspective view showing an ink jet type recording head (a liquid droplet ejection head) in which the bonded body according to the present invention is used.
Figure 7:
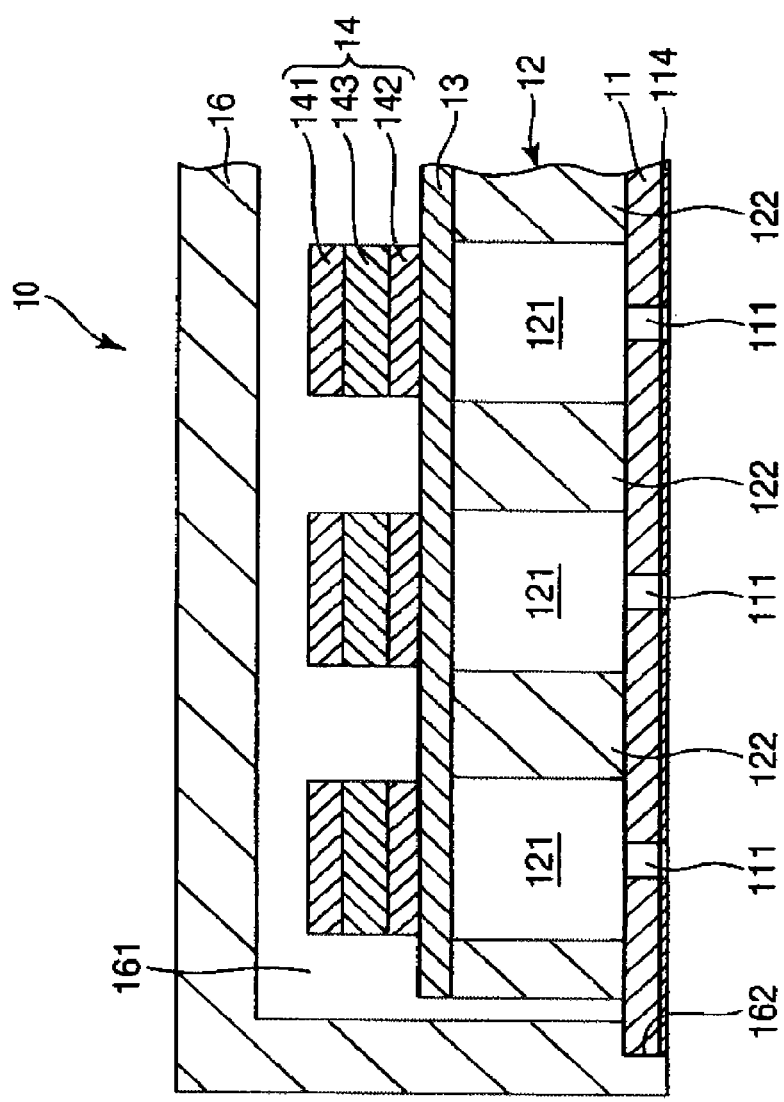
FIG. 7 is a section view illustrating a main portion of the ink jet type recording head shown in FIG. 6.
Figure 8:
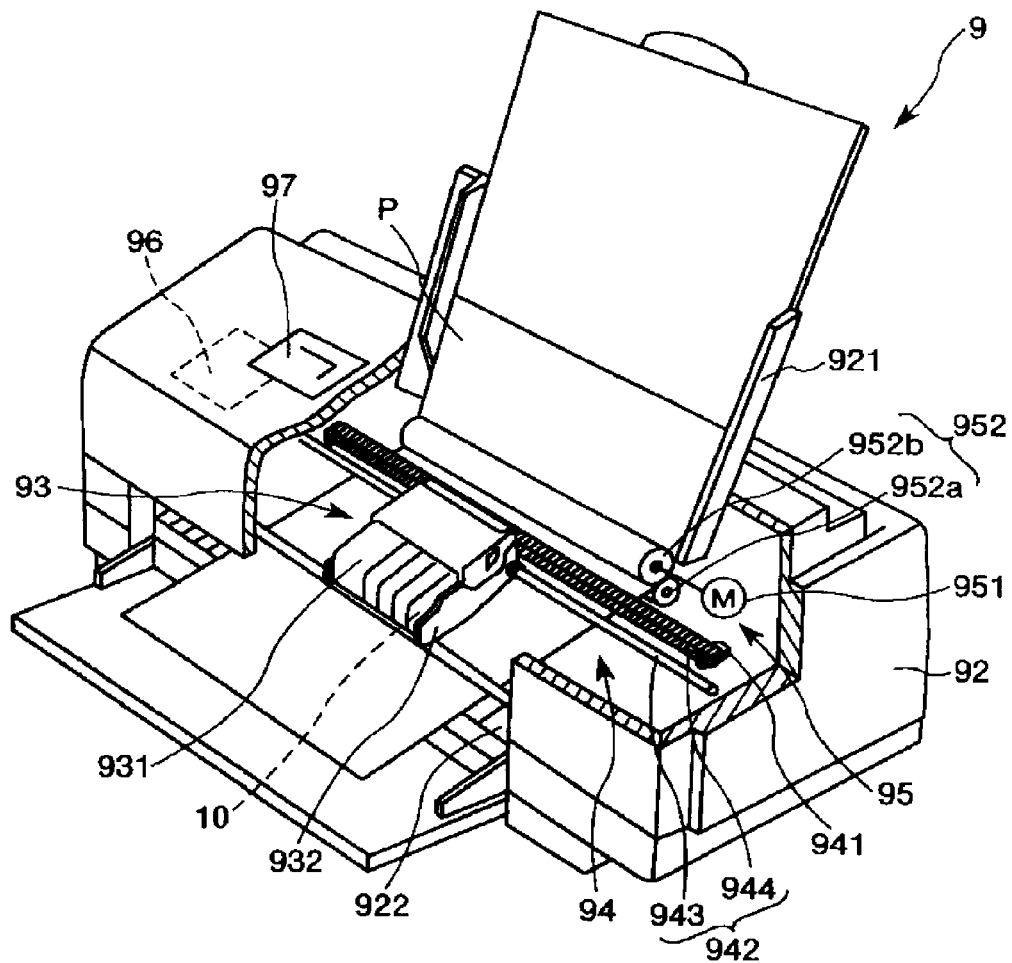
FIG. 8 is a schematic view showing an embodiment of an ink jet printer equipped with the ink jet type recording head shown in FIG. 6.

FIG. 6 is an exploded perspective view showing an ink jet type recording head (the liquid droplet ejection head) in which the bonded body according to the present invention is used. FIG. 7 is a section view illustrating a main portion of the ink jet type recording head shown in FIG. 6. FIG. 8 is a schematic view showing one embodiment of an ink jet printer equipped with the ink jet type recording head shown in FIG. 6. In FIG. 6, the ink jet type recording head is shown in an inverted state as distinguished from a typical use state.

The ink jet type recording head 10 shown in FIG. 6 is mounted to the ink jet printer 9 shown in FIG. 8.

The ink jet printer 9 shown in FIG. 8 includes a printer body 92, a tray 921 provided in an upper rear portion of the printer body 92 for holding recording paper sheets P, a paper discharging port 922 provided in a lower front portion of the printer body 92 for discharging the recording paper sheets P therethrough, and an operation panel 97 provided on an upper surface of the printer body 92.

The operation panel 97 is formed from, e.g., a liquid crystal display, an organic EL display, an LED lamp or the like. The operation panel 97 includes a display portion (not shown) for displaying an error message and the like and an operation portion (not shown) formed from various kinds of switches.

Within the printer body 92, there are provided a printing device (a printing means) 94 having a reciprocating head unit 93, a paper sheet feeding device (a paper sheet feeding means) 95 for feeding the recording paper sheets P into the printing device 94 one by one and a control unit (a control means) 96 for controlling the printing device 94 and the paper sheet feeding device 95.

Under control of the control unit 96, the paper sheet feeding device 95 feeds the recording paper sheets P one by one in an intermittent manner. The recording paper sheet P passes near a lower portion of the head unit 93. At this time, the head unit 93 makes reciprocating movement in a direction generally perpendicular to a feeding direction of the recording paper sheet P, thereby printing the recording paper sheet P.

In other words, an ink jet type printing operation is performed, during which time the reciprocating movement of the head unit 93 and the intermittent feeding of the recording paper sheets P act as primary scanning and secondary scanning, respectively.

The printing device 94 includes a head unit 93, a carriage motor 941 serving as a driving power source of the head unit 93 and a reciprocating mechanism 942 rotated by the carriage motor 941 for reciprocating the head unit 93.

The head unit 93 includes an ink jet type recording head 10 (hereinafter, simply referred to as "head 10") having a plurality of nozzle holes 111 formed in a lower portion thereof, an ink cartridge 931 for supplying an ink to the head 10 and a carriage 932 carrying the head 10 and the ink cartridge 931.

Full color printing becomes available by using, as the ink cartridge 931, a cartridge of the type filled with ink of four colors, i.e., yellow, cyan, magenta and black.

The reciprocating mechanism 942 includes a carriage guide shaft 943 whose opposite ends are supported on a frame (not shown) and a timing belt 944 extending parallel to the carriage guide shaft 943.

The carriage 932 is reciprocatingly supported by the carriage guide shaft 943 and fixedly secured to a portion of the timing belt 944.

If the timing belt 944 wound around a pulley is caused to run in forward and reverse directions by operating the carriage motor 941, the head unit 93 makes reciprocating movement along the carriage guide shaft 943. During this reciprocating movement, an appropriate amount of the ink is ejected from the head 10 to print the recording paper sheets P.

The paper sheet feeding device 95 includes a paper sheet feeding motor 951 serving as a driving power source thereof and a pair of paper sheet feeding rollers 952 rotated by means of the paper sheet feeding motor 951.

The paper sheet feeding rollers 952 include a driven roller 952*a* and a driving roller 952*b*, both of which face toward each other in a vertical direction, with a paper sheet feeding path (the recording paper sheet P) remained therebetween. The driving roller 952*b* is connected to the paper sheet feeding motor 951.

Thus, the paper sheet feeding rollers 952 are able to feed the plurality of the recording paper sheets P, which are held in the tray 921, toward the printing device 94 one by one. In place of the tray 921, it may be possible to employ a construction that can removably hold a paper sheet feeding cassette containing the recording paper sheets P.

The control unit 96 is designed to perform printing by controlling the printing device 94 and the paper sheet feeding device 95 based on printing data inputted from a host computer, e.g., a personal computer or a digital camera.

Although not shown in the drawings, the control unit 96 is mainly comprised of a memory that stores a control program for controlling the respective parts and the like, a piezoelectric element driving circuit for driving piezoelectric elements (vibration sources) 14 to control an ink ejection timing, a driving circuit for driving the printing device 94 (the carriage motor 941), a driving circuit for driving the paper sheet feeding device 95 (the paper sheet feeding motor 951), a communication circuit for receiving the printing data from the host computer, and a CPU electrically connected to the memory and the circuits for performing various kinds of control with respect to the respective parts.

Electrically connected to the CPU are a variety of sensors capable of detecting, e.g., a remaining amount of the ink in the ink cartridge 931 and a position of the head unit 93.

The control unit 96 receives the printing data through the communication circuit and then stores them in the memory. The CPU processes these printing data and outputs driving signals to the respective driving circuits, based on the data thus processed and data inputted from the variety of sensors. Responsive to these signals, the piezoelectric elements 14, the printing device 94 and the paper sheet feeding device 95 come into operation, thereby printing the recording paper sheets P.

Hereinafter, the head 10 will be described in detail with reference to FIGS. 6 and 7.

The head 10 includes a head main body 17 and a base body 16 for receiving the head main body 17. The head main body 17 includes a nozzle plate 11, an ink chamber base plate 12, a vibration plate 13 and a plurality of piezoelectric elements (vibration sources) 14 bonded to the vibration plate 13. The head 10 constitutes a piezo jet type head of on-demand style.

The nozzle plate 11 is made of, e.g., a silicon-based material such as $SiO_2$, SiN or quartz glass, a metal-based material such as Al, Fe, Ni, Cu or alloy containing these metals, an oxide-based material such as alumina or ferric oxide, a carbon-based material such as carbon black or graphite, and the like.

The plurality of the nozzle holes 111 for ejecting ink droplets therethrough are formed in the nozzle plate 11. A pitch of the nozzle holes 111 is suitably set according to a degree of printing accuracy.

The ink chamber base plate 12 is fixed or secured to the nozzle plate 11. In the ink chamber base plate 12, there are formed a plurality of ink chambers (cavities or pressure chambers) 121, a reservoir chamber 123 for reserving the ink supplied from the ink cartridge 931 and a plurality of supply ports 124 through which the ink is supplied from the reservoir chamber 123 to the respective ink chambers 121. These chambers 121, 123 and 124 are defined by the nozzle plate 11, side walls (barrier walls) 122 and the below mentioned vibration plate 13.

The respective ink chambers 121 are formed into a reed shape (a rectangular shape) and are arranged in a corresponding relationship with the respective nozzle holes 111. Volume of each of the ink chambers 121 can be changed in response to vibration of the vibration plate 13 as described below. The ink is ejected from the ink chambers 121 by virtue of this volume change.

As a base material of which the ink chamber base plate 12 is made, it is possible to use, e.g., a monocrystalline silicon substrate, various kinds of glass substrates or various kinds of resin substrates. Since these substrates are all generally used in the art, use of these substrates makes it possible to reduce a manufacturing cost of the head 10.

The vibration plate 13 is bonded to an opposite side of the ink chamber base plate 12 from the nozzle plate 11. The plurality of the piezoelectric elements 14 are provided on an opposite side of the vibration plate 13 from the ink chamber base plate 12.

In a predetermined position of the vibration plate 13, a communication hole 131 is formed through a thickness of the vibration plate 13. The ink can be supplied from the ink cartridge 931 to the reservoir chamber 123 through the communication hole 131.

Each of the piezoelectric elements 14 includes an upper electrode 141, a lower electrode 142 and a piezoelectric body layer 143 interposed between the upper electrode 141 and the lower electrode 142. The piezoelectric elements 14 are arranged in alignment with generally central portions of the respective ink chambers 121.

The piezoelectric elements 14 are electrically connected to the piezoelectric element driving circuit and are designed to be operated (vibrated or deformed) in response to the signals supplied from the piezoelectric element driving circuit.

The piezoelectric elements 14 act as vibration sources. The vibration plate 13 is vibrated by operation of the piezoelectric elements 14 and has a function of instantaneously increasing internal pressures of the ink chambers 121.

The base body 16 is made of, e.g., various kinds of resin materials or various kinds of metallic materials. The nozzle plate 11 is fixed to and supported by the base body 16. Specifically, in a state that the head main body 17 is received in a recess portion 161 of the base body 16, an edge of the nozzle plate 11 is supported on a shoulder 162 of the base body 16 extending along an outer circumference of the recess portion 161.

When bonding the nozzle plate 11 and the ink chamber base plate 12, the ink chamber base plate 12 and the vibration plate 13, and the nozzle plate 11 and the base body 16 as mentioned above, the method of manufacturing the bonded body according to the present invention is used in at least one bonded portion thereof.

In other words, the bonded body of the present invention is used in at least one of a bonded body in which the nozzle plate 11 and the ink chamber base plate 12 are bonded together, a bonded body in which the ink chamber base plate 12 and the vibration plate 13 are bonded together, and a bonded body in which the nozzle plate 11 and the base body 16 are bonded together.

Such a head 10 exhibits increased bonding strength and chemical resistance in bonding interfaces (the bonded portion), which in turn leads to increased durability and liquid tightness against the ink reserved in the respective ink chambers 121. As a result, the head 10 is rendered highly reliable.

Furthermore, highly reliable bonding is available even at an extremely low temperature. There is an advantage that a head with an increased area can be fabricated from members made of materials having different linear expansion coefficients.

With the head 10 set forth above, no deformation occurs in the piezoelectric body layer 143, in the case where a predetermined ejection signal has not been inputted from the piezoelectric element driving circuit, that is, a voltage has not been applied between the upper electrode 141 and the lower electrode 142 of each of the piezoelectric elements 14.

For this reason, no deformation occurs in the vibration plate 13 and no change occurs in the volumes of the ink chambers 121. Therefore, the ink droplets have not been ejected from the nozzle holes 111.

On the other hand, the piezoelectric body layer 143 is deformed, in the case where the predetermined ejection signal is inputted from the piezoelectric element driving circuit, that is, the voltage is applied between the upper electrode 141 and the lower electrode 142 of each of the piezoelectric elements 14.

Thus, the vibration plate 13 is heavily deflected to change the volumes of the ink chambers 121. At this moment, pressures within the ink chambers 121 are instantaneously increased and the ink droplets are ejected from the nozzle holes 111.

when one ink ejection operation has ended, the piezoelectric element driving circuit ceases to apply the voltage between the upper electrode 141 and the lower electrode 142. Thus, the piezoelectric elements 14 are returned substantially to their original shapes, thereby increasing the volumes of the ink chambers 121.

At this time, a pressure acting from the ink cartridge 931 toward the nozzle holes 111 (a positive pressure) is imparted to the ink. This prevents an air from entering the ink chambers 121 through the nozzle holes 111, which ensures that the ink is supplied from the ink cartridge 931 (the reservoir chamber 123) to the ink chambers 121 in a quantity corresponding to the quantity of the ink ejected.

By sequentially inputting ejection signals from the piezoelectric element driving circuit to the piezoelectric elements 14 lying in target printing positions, it is possible to print an arbitrary (desired) letter, figure or the like.

The head 10 may be provided with thermoelectric conversion elements in place of the piezoelectric elements 14. In other words, the head 10 may have a configuration in which the ink is ejected using a thermal expansion of a material caused by the thermoelectric conversion elements (which is sometimes called a bubble jet method wherein the term "bubble jet" is a registered trademark).

In the head 10 configured as above, a film 114 is formed on the nozzle plate 11 in an effort to impart liquid repellency thereto. By doing so, it is possible to reliably prevent the ink droplets from adhering to peripheries of the nozzle holes 111, which would otherwise occur when the ink droplets are ejected from the nozzle holes 111.

As a result, it becomes possible to make sure that the ink droplets ejected from the nozzle holes 111 are reliably landed (hit) on target regions.

EXAMPLES

Next, description will be made on a number of concrete examples of the present invention.

1. Manufacture of Bonded Body

Example 1

First, a monocrystalline silicon substrate having a length of 20 mm, a width of 20 mm and an average thickness of 1 mm was prepared as a first base member. A quartz glass substrate having a length of 20 mm, a width of 20 mm and an average thickness of 1 mm was prepared as a second base member.

Both the monocrystalline silicon substrate and the quartz glass substrate were subjected to a surface treatment using oxygen plasma.

In this way, liquid wettability was imparted to the entire of the surface of each of the monocrystalline silicon substrate and the quartz glass substrate.

Next, a silane coupling agent having a functional group including a fluoroalkyl group ("KY-130" produced by Shin-Etsu Silicones) was dissolved in a solvent ("FR thinner" produced by Shin-Etsu Silicones) so as to become 0.1 mass % to obtain a treatment liquid.

Thereafter, the treatment liquid was supplied onto an inner region (a bonding film formation region) of each of the monocrystalline silicon substrate and the quartz glass substrate using an ink jet method. In this regard, the inner region was a region other than a frame-shaped circumference region thereof having a width of 3 mm.

Next, the treatment liquid supplied onto each of the monocrystalline silicon substrate and the quartz glass substrate was heated and dried under a condition of 100° C.×15 minutes. In this way, liquid repellency was imparted to the bonding film non-formation region of each of the monocrystalline silicon substrate and the quartz glass substrate to form a liquid repellent region thereon.

Next, a liquid material having a viscosity of 18.0 mPa·s at 25° C. ("KR-251" produced by Shin-Etsu Chemical Co., Ltd.) was prepared. In this regard, the liquid material contained a silicone material composed of silicone compounds each having a polydimethylsiloxane chemical structure, and toluene and isobutanol as a solvent.

Then, the liquid material was supplied onto the monocrystalline silicon substrate and the quartz glass substrate using a roll coating method. At this time, the liquid material supplied onto each of the monocrystalline silicon substrate and the quartz glass substrate was repelled due to the liquid repellency of the liquid repellent region (the bonding film non-formation region) so that it did not adhere thereto and selectively adhered to the frame-shaped circumference region (the bonding film formation region) thereof.

Next, the liquid material supplied onto each of the monocrystalline silicon substrate and the quartz glass substrate was dried at normal temperature (25° C.) for 24 hours. In this way, the liquid material was hardened to thereby obtain a bonding film on each of the monocrystalline silicon substrate and the quartz glass substrate.

Then, an ultraviolet ray was irradiated on the bonding film formed on each of the monocrystalline silicon substrate and the quartz glass substrate under the following conditions.

Ultraviolet Ray Irradiation Conditions
Composition of atmospheric gas: air atmosphere
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes Next, when one minute elapsed after the ultraviolet ray was irradiated on the bonding films, the monocrystalline silicon substrate and the quartz glass substrate were laminated together so that the bonding films made contact with each other to thereby obtain a bonded body.

Then, the bonded body was heated at a temperature of 80° C. while compressing the same under a pressure of 3 MPa and were maintained for 15 minutes. In this way, bonding strength between the monocrystalline silicon substrate and the quartz glass substrate was improved.

Example 2

In this Example 2, a bonded body was manufactured in the same manner as in the Example 1, except that the heating temperature in compressing and heating the bonded body obtained was changed from 80° C. to 25° C.

Examples 3 to 13

In each of these Examples 3 to 13, a bonded body was manufactured in the same manner as in the Example 1, except that the constitute material of the first base member and the constitute material of the second base member were changed to materials shown in Table 1.

Example 14

In this Example 14, a bonded body was manufactured in the same manner as in the Example 1, except that the liquid repellency was imparted to the bonding film non-formation region of each of the monocrystalline silicon substrate and the quartz glass substrate by performing a plasma treatment using a $C_2F_6$ gas as a treatment gas.

Example 15

In this Example 15, a bonded body was manufactured in the same manner as in the Example 1, except that the liquid repellency was imparted to the bonding film non-formation region of each of the monocrystalline silicon substrate and the quartz glass substrate by forming a plasma polymerization film using a $C_2F_6$ gas as a raw gas.

Example 16

In this Example 16, a bonded body was manufactured in the same manner as in the Example 1, except that the bonding film was only formed on the monocrystalline silicon substrate and the bonding film was not formed on the quartz glass substrate.

Example 17

First, a bonding film was formed on a frame-shaped circumference region of a monocrystalline silicon substrate having a width of 3 mm in the same manner as in the Example 1. On the other hand, a bonding film was formed on a frame-shaped circumference region of a quartz glass substrate having a width of 3 mm in the same manner as in the Example 14.

Next, the monocrystalline silicon substrate and the quartz glass substrate were laminated together so that the bonding films made contact with each other to thereby obtain a provisional bonded body.

Then, an ultraviolet ray was irradiated on the provisional bonded body under the following conditions.

Ultraviolet Ray Irradiation Conditions
Composition of atmospheric gas: nitrogen atmosphere
Temperature of atmospheric gas: 20° C.
Pressure of atmospheric gas: atmospheric pressure (100 kPa)
Wavelength of ultraviolet ray: 172 nm
Irradiation time of ultraviolet ray: 5 minutes In this way, the monocrystalline silicon substrate and the quartz glass substrate were bonded together through the bonding films to thereby obtain a bonded body.

Then, the bonded body was heated at a temperature of 80° C. while compressing the same under a pressure of 3 MPa and were maintained for 15 minutes. In this way, bonding strength between the monocrystalline silicon substrate and the quartz glass substrate was improved.

Comparative Examples 1 to 3

In each of these Comparative Examples 1 to 3, a bonded body was manufactured in the same manner as in the Example 1, except that materials shown in Table 1 were used as the constitute material of the first base member and the constitute material of the second base member, and frame-shaped circumference regions of the base members each having a width of 3 mm were bonded together using an epoxy-based adhesive.

Comparative Examples 4 to 6

In each of these Comparative Examples 4 to 6, a bonded body was manufactured in the same manner as in the Example 1, except that materials shown in Table 1 were used as the constitute material of the first base member and the constitute material of the second base member, and frame-shaped circumference regions of the base members each having a width of 3 mm were bonded together using an Ag paste.

Reference Examples 1 to 3

In each of these Reference Examples 1 to 3, a bonded body was manufactured in the same manner as in the Example 1, except that materials shown in Table 1 were used as the constitute material of the first base member and the constitute material of the second base member, the bonding film was formed on the entire of each of the bonding surfaces of the base members and the ultraviolet ray was irradiated on the entire of each of the bonding films.

In this way, the first base member and the second base member were entirely bonded together through the bonding films.

2. Evaluation of Bonded Body
2.1 Evaluation of Bonding Strength (Splitting Strength)

Bonding strength was measured for each of the bonded bodies obtained in the Examples 1 to 17, the Comparative Examples 1 to 6 and the Reference Examples 1 to 3.

The measurement of the bonding strength was performed by trying removal of the first base member from the second base member. The bonding strength (load) was defined by a value measured just before the first base member was peeled off from the second base member.

As a result, the bonding strength measured for each of the bonded bodies obtained in the Examples 1 to 17 was lower than the bonding strength measured for each of the bonded bodies obtained in the Reference Examples 1 to 3.

This means that the bonding strength (a degree of the load) between the first base member and the second base member could be changed between the case that the bonding films was formed on a part of the bonding surface and the case that the bonding film was formed on the entire of the bonding surface. Namely, it became apparent that the bonding strength between the first base member and the second base member could be changed by controlling the size of the bonding film.

Further, the bonding strength measured for each of the bonded bodies obtained in the Examples 1 to 17 was higher than the bonding strength measured for each of the bonded bodies obtained in the Comparative Examples 1 to 6.

2.2 Evaluation of Dimensional Accuracy

Dimensional accuracy in a thickness direction was measured for each of the bonded bodies obtained in the Examples 1 to 17, the Comparative Examples 1 to 6 and the Reference Examples 1 to 3.

The evaluation of the dimensional accuracy was performed by measuring a thickness of each corner portion of the bonded body having a squire shape, calculating a difference between a maximum value and a minimum value of the thicknesses measured, and evaluating the difference according to criteria described below.

Evaluation Criteria for Dimensional Accuracy
A: less than 10 μm
B: 10 μm or more 2.3 Evaluation of Chemical Resistance Each of the bonded bodies obtained in the Examples 1 to 17, the Comparative Examples 1 to 6 and the Reference Examples 1 to 3 was immersed in an ink for an ink-jet printer ("HQ4" produced by Seiko Epson Corporation), which was maintained at a temperature of 80° C., for three weeks.

Thereafter, the first base member was removed from the second base member, and it was checked whether or not the ink penetrated into a bonding interface of the bonded body. The result of the check was evaluated according to criteria described below.

Evaluation Criteria for Chemical Resistance
A: The ink did not penetrate into the bonded body at all.
B: The ink penetrated into the corner portions of the bonded body slightly.
C: The ink penetrated along the edge portions of the bonded body.
D: The ink penetrated into the inside of the bonded body.

2.4 Evaluation of Shape Change

Shape changes of the first base member and the second base member were checked for each of the bonded bodies obtained in the Examples 1 to 17, the Comparative Examples 1 to 6 and the Reference Examples 1 to 3.

Specifically, warp amounts of the first base member and the second base member were measured before and after the bonded body was manufactured, a change between the warp amounts was evaluated according to criteria described below.

Evaluation Criteria for Change between Warp Amounts
A: The warp amounts of the first base member and the second base member were changed hardly before and after the bonded body was manufactured.
B: The warp amounts of the first base member and the second base member were changed slightly before and after the bonded body was manufactured.
C: The warp amounts of the first base member and the second base member were changed rather significantly before and after the bonded body was manufactured.
D: The warp amounts of the first base member and the second base member were changed significantly before and after the bonded body was manufactured.

TABLE 1

| | Conditions for Manufacturing Bonded Body | | | | | | | Evaluation Results | | |
|---|---|---|---|---|---|---|---|---|---|---|
| | Constituent Material of First Base Member | Constituent Material of Second Base Member | Method of Imparting Liquid Repellency | Bonding Film | Bonding Region | Irradiation of Ultraviolet Ray | Heating Temperature of Bonded Body | Dimensional Accuracy | Chemical Resistance | Change of Warp Amounts |
| Ex. 1 | Silicon | Quartz Glass | Silane Coupling Agent | Silicon Material | a Part of | Before Laminating | 80° C. | A | A | A |

TABLE 1-continued

| | Conditions for Manufacturing Bonded Body | | | | | | Evaluation Results | | |
|---|---|---|---|---|---|---|---|---|---|
| | Constituent Material of First Base Member | Constituent Material of Second Base Member | Method of Imparting Liquid Repellency | Bonding Film | Bonding Region | Irradiation of Ultraviolet Ray | Heating Temperature of Bonded Body | Dimensional Accuracy | Chemical Resistance | Change of Warp Amounts |
| Ex. 2 | Silicon | Quartz Glass | Silane Coupling Agent | Silicon Material | Bonding Surface | | 25° C. | A | A | A |
| Ex. 3 | Silicon | Silicon | Silane Coupling Agent | Silicon Material | | | 80° C. | A | A | A |
| Ex. 4 | Silicon | Stainless Steel | Silane Coupling Agent | Silicon Material | | | 80° C. | A | A | B |
| Ex. 5 | Silicon | Aluminum | Silane Coupling Agent | Silicon Material | | | 80° C. | A | A | B |
| Ex. 6 | Silicon | PET | Silane Coupling Agent | Silicon Material | | | 80° C. | A | A | B |
| Ex. 7 | Silicon | PI | Silane Coupling Agent | Silicon Material | | | 80° C. | A | A | B |
| Ex. 8 | Quartz Glass | Quartz Glass | Silane Coupling Agent | Silicon Material | | | 80° C. | A | A | A |
| Ex. 9 | Quartz Glass | Stainless Steel | Silane Coupling Agent | Silicon Material | | | 80° C. | A | A | B |
| Ex. 10 | Stainless Steel | PET | Silane Coupling Agent | Silicon Material | | | 80° C. | A | A | B |
| Ex. 11 | Stainless Steel | PI | Silane Coupling Agent | Silicon Material | | | 80° C. | A | A | B |
| Ex. 12 | Stainless Steel | Aluminum | Silane Coupling Agent | Silicon Material | | | 80° C. | A | A | A |
| Ex. 13 | Stainless Steel | Stainless Steel | Silane Coupling Agent | Silicon Material | | | 80° C. | A | A | A |
| Ex. 14 | Silicon | Quartz Glass | Plasma Treatment | Silicon Material | | | 80° C. | A | A | A |
| Ex. 15 | Silicon | Quartz Glass | Plasma Polymerization Film | Silicon Material | | | 80° C. | A | A | A |
| Ex. 16 | Silicon | Quartz Glass | Silane Coupling Agent (Only Silicon Substrate) | Silicon Material (Only Silicon Substrate) | | | 80° C. | A | A | B |
| Ex. 17 | Silicon | Quartz Glass | Silane Coupling Agent | Silicon Material | | After Laminating | 80° C. | A | A | A |
| Comp. Ex. 1 | Silicon | Quartz Glass | — | Epoxy-based Adhesive | a Part of | — | 80° C. | B | C | A |
| Comp. Ex. 2 | Silicon | Silicon | | | Bonding Surface | | 80° C. | B | C | A |
| Comp. Ex. 3 | Silicon | Stainless Steel | | | | | 80° C. | B | C | B |
| Comp. Ex. 4 | Stainless Steel | Quartz Glass | | Conductive Paste | | | 80° C. | B | C | B |
| Comp. Ex. 5 | Stainless Steel | Silicon | | (Ag Paste) | | | 80° C. | B | C | B |
| Comp. Ex. 6 | Stainless Steel | Stainless Steel | | | | | 80° C. | B | C | A |
| Ref. Ex. 1 | Silicon | Quartz Glass | — | Silicon Material | Entire of | — | 80° C. | A | A | C |
| Ref. Ex. 2 | Silicon | Silicon | | Silicon Material | Bonding Surface | | 80° C. | A | A | C |
| Ref. Ex. 3 | Silicon | Stainless Steel | | Silicon Material | | | 80° C. | A | A | C |

*PET: Polyethylene Terephthalate, PI: Polyimide

As is apparent in Table 1, the bonded bodies obtained in the Examples 1 to 17 exhibited excellent characteristics in all the items of the dimensional accuracy, the chemical resistance and the changes of the warp amounts. Further, the bonded bodies obtained in the Examples 1 to 17 had the changes of the warp amounts smaller than those of the bonded bodies obtained in the Reference Examples 1 to 3.

On the other hand, the bonded bodies obtained in the Comparative Examples 1 to 6 did not have enough chemical resistance. Further, it was confirmed that the dimensional accuracy of the bonded bodies was low.

What is claimed is:
1. A method of manufacturing a bonded body of a semiconductor substrate and a semiconductor device to be mounted on the semiconductor substrate, wherein the bonded body is configured such that a first base member and a second base member are bonded together through a bonding film formed using a liquid material containing a silicone material composed of silicone compounds, the method comprising:
preparing the first base member having a surface, a bonding film formation region, where the bonding film is to be formed, provided on the surface and a bonding film non-formation region, where the bonding film is not to be formed, provided on the surface so as to be adjacent to the bonding film formation region, and the second base member;

imparting liquid repellency for the liquid material to at least a part of the bonding film non-formation region to form a liquid repellent region thereon;

supplying the liquid material onto the first base member to selectively form a liquid coating on the bonding film formation region with the aid of the liquid repellency of the liquid repellent region;

drying the liquid coating to obtain the bonding film on the bonding film formation region; and bonding the first base member and the second base member together through the bonding film due to a bonding property developed in a vicinity of a surface of the bonding film by applying energy thereto to thereby obtain the bonded body.

2. The method as claimed in claim 1, wherein each of the silicone compounds has a polydimethylsiloxane chemical structure as a main chemical structure thereof.

3. The method as claimed in claim 1, wherein each of the silicone compounds has at least one silanol group.

4. The method as claimed in claim 1, wherein the liquid repellent region is formed so as to surround the bonding film formation region.

5. The method as claimed in claim 1, wherein the liquid repellent region is formed by introducing liquid repellent functional groups each having the liquid repellency for the liquid material to the bonding film non-formation region or by forming a liquid repellent film having the liquid repellency for the liquid material on the bonding film non-formation region.

6. The method as claimed in claim 5, wherein each of the liquid repellent functional groups is a fluoroalkyl group.

7. The method as claimed in claim 5, wherein the liquid repellent film is a self-assembled film or a plasma polymerization film.

8. The method as claimed in claim 1, wherein in the liquid material supplying step, before the liquid material is supplied onto the first base member, the bonding film formation region is subjected to a liquid wettable treatment capable of imparting liquid wettability for the liquid material to the bonding film formation region.

9. The method as claimed in claim 8, wherein the liquid wettable treatment is performed by introducing hydroxyl groups to the bonding film formation region.

10. The method as claimed in claim 1, wherein in the step of bonding the first base member and the second base member, after the first base member and the second base member are laminated together through the bonding film, the energy is applied to the bonding film to thereby bond them together through the bonding film.

11. The method as claimed in claim 1, wherein in the bonding step, the energy is applied to the bonding film by at least one method selected from the group consisting of a method in which an energy beam is irradiated on the bonding film, a method in which the bonding film is heated and a method in which a compressive force is applied to the bonding film.

12. The method as claimed in claim 11, wherein the energy beam is an ultraviolet ray having a wavelength of 126 to 300 nm.

13. The method as claimed in claim 11, wherein a temperature of the heating is in the range of 25 to 100° C.

14. The method as claimed in claim 11, wherein the compressive force is in the range of 0.2 to 10 MPa.

15. The method as claimed in claim 14, wherein in the bonding step, the energy is applied to the bonding film in an air atmosphere.

16. The method as claimed in claim 1, wherein an average thickness of the bonding film is in the range of 100 nm to 100 µm.

17. The method as claimed in claim 1, wherein at least a portion of the first base member which makes contact with the bonding film is composed of a silicon material, a metal material or a glass material as a major component thereof.

18. The method as claimed in claim 1, wherein the second base member has a bonding film which is the same as the bonding film formed on the first base member, and wherein in the bonding step, the first base member and the second base member are bonded together through the bonding films.

19. The method as claimed in claim 1, further comprising subjecting the bonded body to a treatment for improving bonding strength between the first base member and the second base member after the bonding step.

20. The method as claimed in claim 19, wherein the treatment for improving the bonding strength is performed by at least one method selected from the group consisting of a method in which an energy beam is irradiated on the bonding film and a method in which the bonding film is heated.

21. A bonded body of a semiconductor substrate and a semiconductor device to be mounted on the semiconductor substrate manufactured by the method of claim 1.

* * * * *